United States Patent
You et al.

(10) Patent No.: US 6,226,616 B1
(45) Date of Patent: May 1, 2001

(54) SOUND QUALITY OF ESTABLISHED LOW BIT-RATE AUDIO CODING SYSTEMS WITHOUT LOSS OF DECODER COMPATIBILITY

(75) Inventors: Yu-Li You, Thousand Oaks, CA (US); William Paul Smith, Co. Down (IE); Zoran Fejzo, Los Angeles, CA (US); Stephen Smyth, Co. Down (IE)

(73) Assignee: Digital Theater Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/337,405

(22) Filed: Jun. 21, 1999

(51) Int. Cl.[7] ........................................ B10L 21/04
(52) U.S. Cl. .................... 704/500; 704/501; 704/502
(58) Field of Search ................................ 704/500, 501, 704/502, 503, 504, 201

(56) References Cited

U.S. PATENT DOCUMENTS

| | | | |
|---|---|---|---|
| Re. 32,124 | * 4/1986 | Atal | 704/230 |
| 4,354,057 | * 10/1982 | Atal | 704/219 |
| 4,554,670 | * 11/1985 | Aiko et al. | 375/249 |
| 4,860,312 | * 8/1989 | Heuvel et al. | 375/243 |

* cited by examiner

Primary Examiner—David Hudspeth
Assistant Examiner—Daniel Abebe
(74) Attorney, Agent, or Firm—Koppel & Jacobs

(57) ABSTRACT

A multi-channel audio compression technology is presented that extends the range of sampling frequencies compared to existing technologies and/or lowers the noise floor while remaining compatible with those earlier generation technologies. The high-sampling frequency multi-channel audio is decomposed into core audio up to the existing sampling frequencies and a difference signal up to the sampling frequencies of the next generation technologies. The core audio is encoded using a first generation technology such as DTS, Dolby AC-3 or MPEG I or II such that the encoded core bit stream is fully compatible with a comparable decoder in the market. The difference signal is encoded using technologies that extend the sampling frequency and/or improve the quality of the core audio. The compressed difference signal is attached as an extension to the core bit stream. The extension data will be ignored by the first generation decoders but can be decoded by the second generation decoders. By summing the decoded core and extension audio signals together, a second generation decoder can effectively extend the audio signal bandwidth and/or improve the signal to noise ratio beyond that available through the core decoder alone.

21 Claims, 15 Drawing Sheets

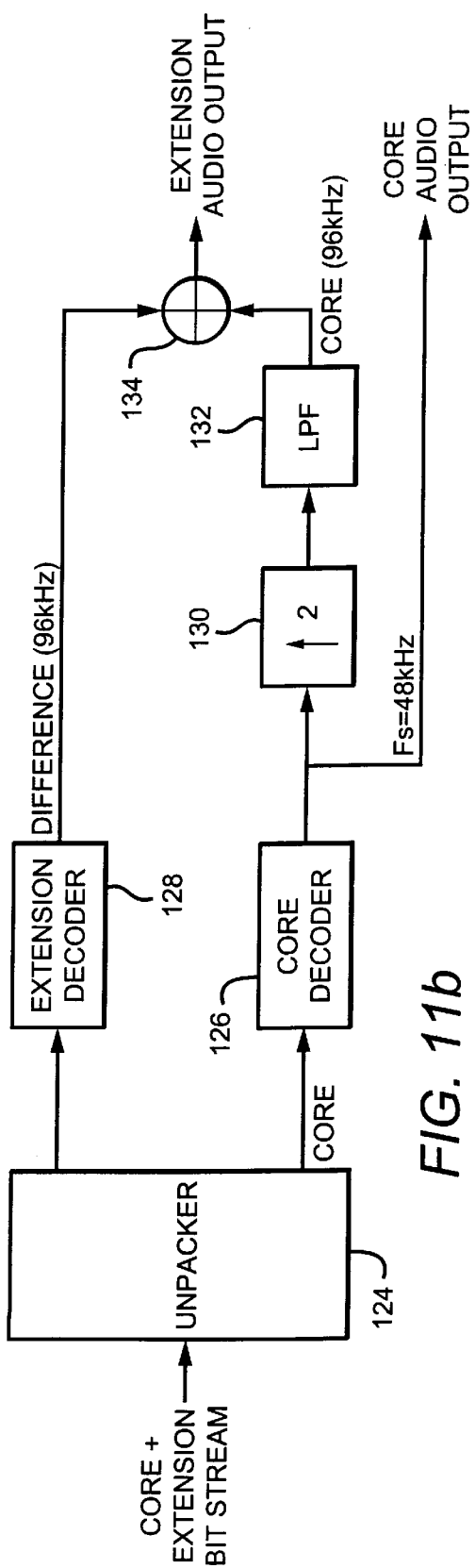
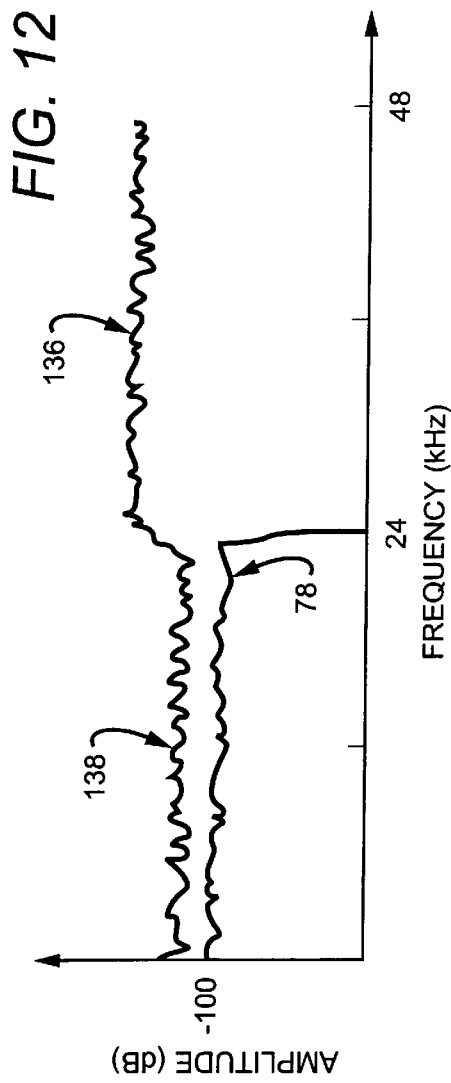

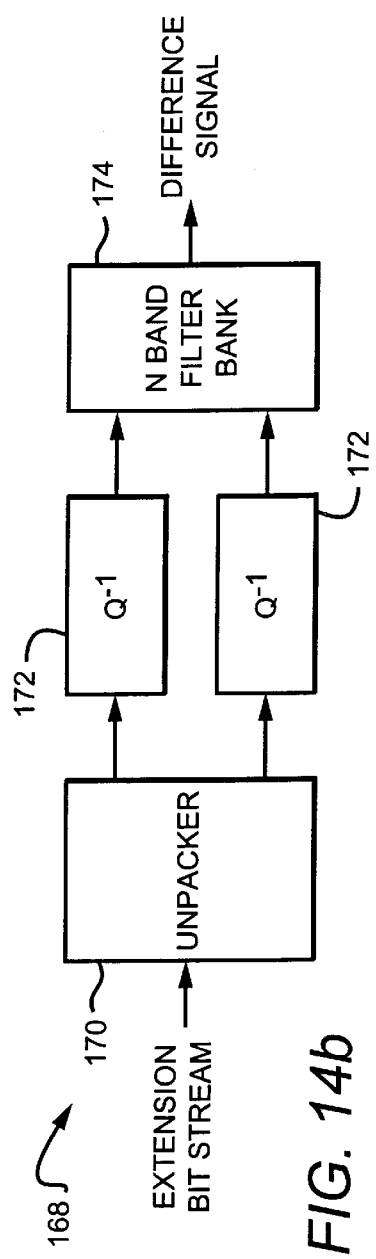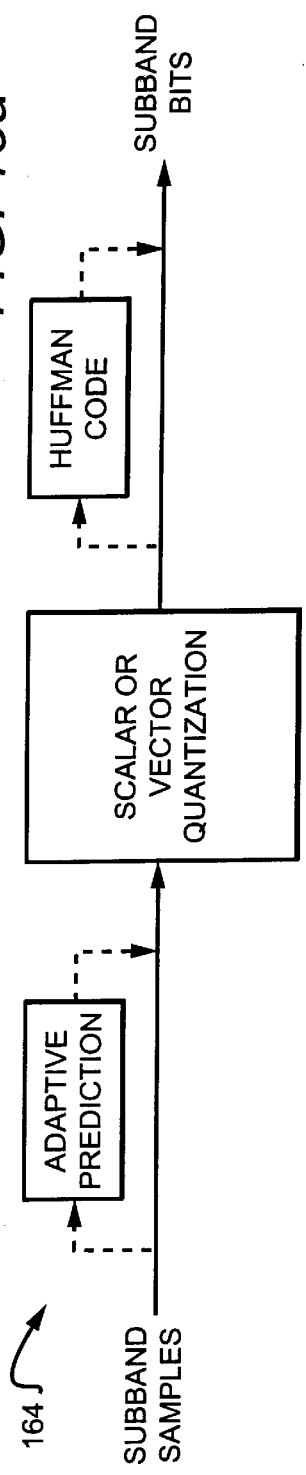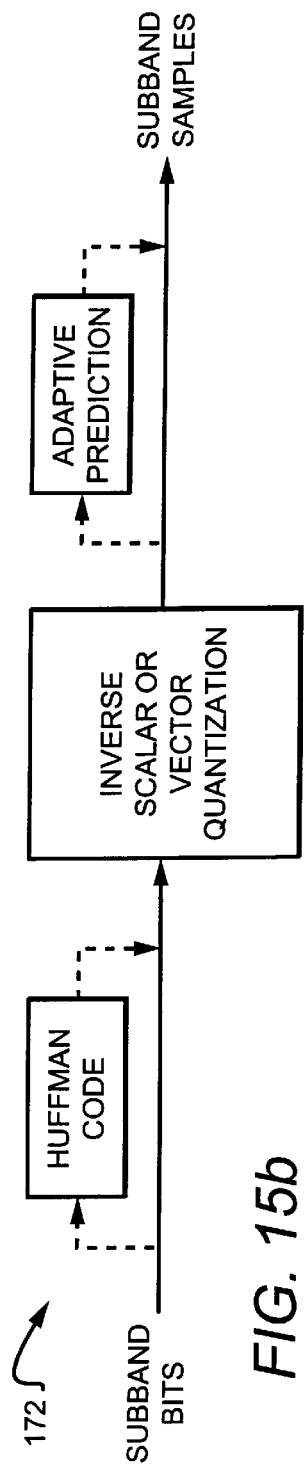

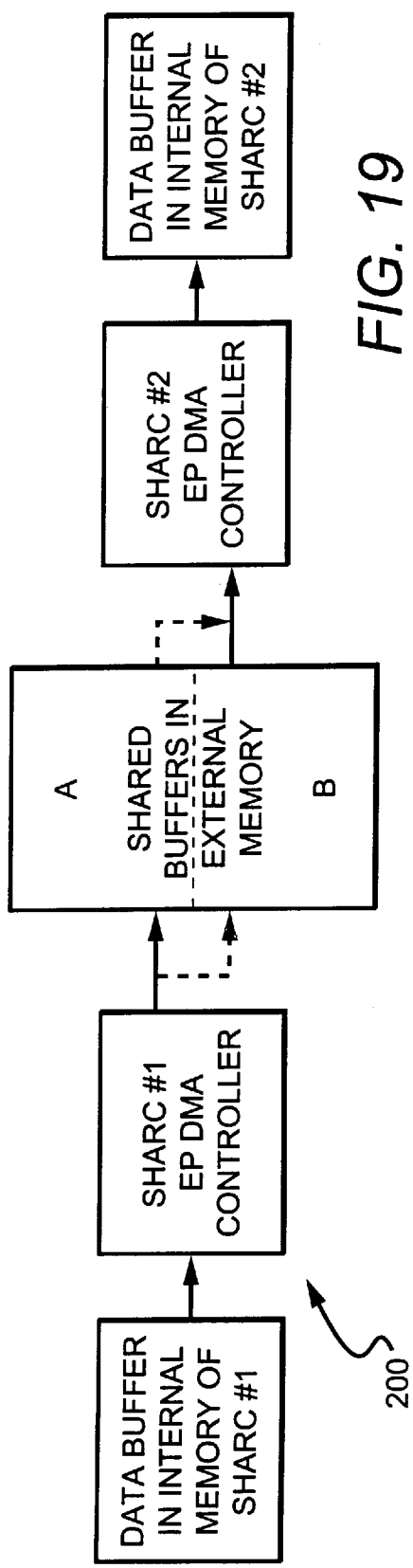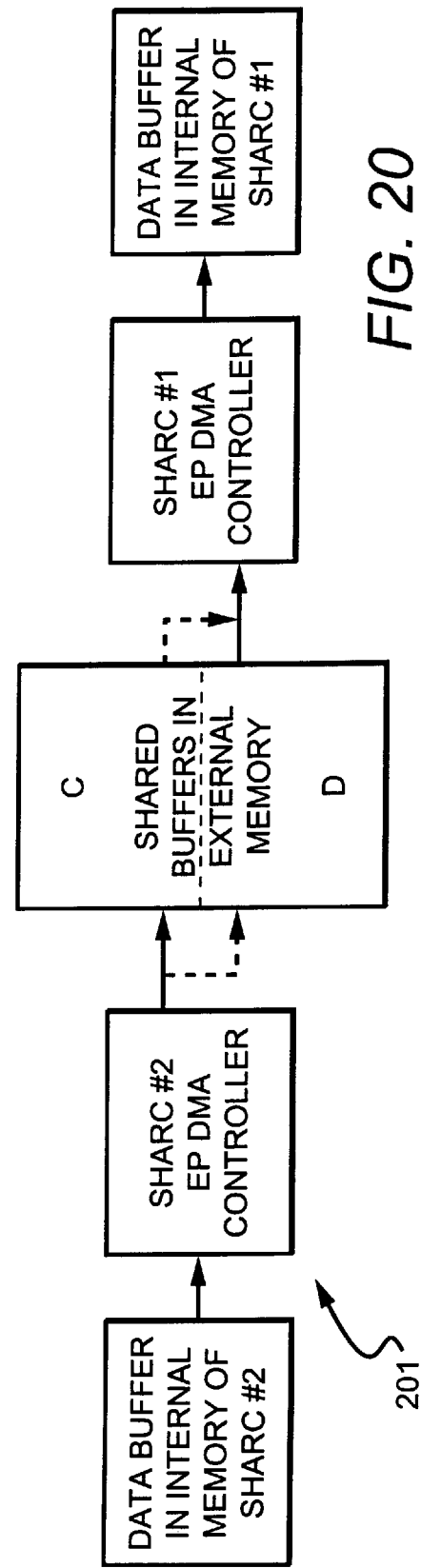

SOUND QUALITY OF ESTABLISHED LOW BIT-RATE AUDIO CODING SYSTEMS WITHOUT LOSS OF DECODER COMPATIBILITY

BACKGROUND OF THE INVENTION

1. Field of the Invention

This invention relates to low bit-rate audio coding systems and more specifically to a method of improving sound quality of established low bit-rate audio coding systems without loss of decoder compatibility.

2. Description of the Related Art

Numbers of low bit-rate audio coding systems are currently in use in a wide range of consumer and professional audio playback products and services. For example, Dolby AC3 (Dolby digital) audio coding system is a world-wide standard for encoding stereo and 5.1 channel audio sound tracks for Laser Disc, NTSC coded DVD video, and ATV, using bit rates up to 640 kbit/s. MPEG I and MPEG II audio coding standards are widely used for stereo and multi-channel sound track encoding for PAL encoded DVD video, terrestrial digital radio broadcasting in Europe and Satellite broadcasting in the US, at bit rates up to 768 kbit/s. DTS (Digital Theater Systems) Coherent Acoustics audio coding system is frequently used for studio quality 5.1 channel audio sound tracks for Compact Disc, DVD video and Laser Disc and bit rates up to 1536 kbit/s.

A major problem with these systems is that their designs are inflexible in that they cannot be easily upgraded to accommodate higher PCM sampling frequencies, PCM word lengths or higher system bit rates. This will become an important issue in coming years as the music and film industry moves to drop the old compact disc digital audio format of 44.1 kHz sampling frequency and 16 bit word length, and adopt the new DVD audio PCM mastering format of 96 kHz sampling and 24 bits word length.

As a result, audio delivery using existing audio encoding systems such as AC-3, MPEG and DTS, must adapt to allow the benefits of this increased signal fidelity to pass to the consumer. Unfortunately a large installed base of audio decoder processing chips (DSPs) which implement these decoder functions already reside in the existing consumer base. These decoders cannot be easily upgraded to accommodate the increasing sampling rates, word size, or bit rates. Consequently, music and film content providers selling product through these mediums will be forced to continue to supply coded audio streams that are compliant with the old standards. This implies that in the future, delivery media such as DVD audio, ATV, satellite radio etc, may be forced to deliver multiple bit streams, each conforming to different standards. For example, one stream would be included in order to allow owners of existing playback systems to receive and play the standard audio tracks, while a second stream would also reside to allow owners of newer equipment to play audio tracks encoded using the 96 kHz/24 bit PCM format and take advantage of the inherently higher fidelity.

The problem with this method of delivery is that many of the playback mediums may not be able to afford the extra bandwidth, or channel capacity, necessary to send the additional audio streams. The bit rate of the additional bit streams (for example, those that support 96 kHz/24 bits) will be at least equal or greater than those that support the old format. Hence the bit rate will most likely double or more, in order to support two or more audio standards.

SUMMARY OF THE INVENTION

In view of the above problems, the present invention provides a coding methodology that extends the frequency range and lowers the noise floor while avoiding having to deliver replica audio data and is therefore much more efficient at accommodating changes in PCM sampling frequency, word length and coding bit rates.

This is accomplished with a 'core' plus 'extension' coding methodology, in which the traditional audio coding algorithm constitutes the 'core' audio coder, and remains unaltered. The audio data necessary to represent higher audio frequencies (in the case of higher sampling rates) or higher sample resolution (in the case of larger word lengths), or both, is transmitted as an 'extension' stream. This allows audio content providers to include a single audio bit stream that is compatible with different types of decoders resident in the consumer equipment base. The core stream will be decoded by the older decoders which will ignore the extension data, while newer decoders will make use of both core and extension data streams giving higher quality sound reproduction.

A key feature of the system is that the extension data is generated by subtracting a reconstructed core signal (encoded/decoded and/or downsampled/upsampled) from the original 'high fidelity' input signal. The resulting difference signal is encoded to produce the extension stream. With this technique, aliasing fold-back into either the core or extension signals is avoided. Hence, the quality of the core audio is unaffected by the inclusion of the extension stream. For the system to work in its most elementary mode, only the latency, or delay, of the core coder needs to be known. Hence, this method can be successfully applied to any audio coding system even without knowledge of the coder's internal algorithms or implementation details. However the system can be made to work more efficiently if the extension coder is design to match the core coder over the frequency range of the core signal.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 11a and 11b are, respectively, block diagrams of an encoder and a decoder that embody a high frequency extension framework;

FIG. 12 is a plot of the frequency spectrum of the reconstructed audio signal for a multi-tone test signal a fixed bit rate;

FIG. 13 is a block diagrams of an encoder that embody an alternate high frequency extension framework;

FIGS. 14a and 14b are, respectively, block diagrams of an extension encoder and decoder;

FIGS. 15a and 15b are, respectively, block diagrams of the subband encoder and decoders;

FIG. 19 illustrates the data flow from the on-chip memory of the first processor to the on-chip memory of the second processor;

FIG. 20 illustrates the data flow from the on-chip memory of the second processor to the on-chip memory of the first processor;

DETAILED DESCRIPTION OF THE INVENTION

The present invention defines a 'core' plus 'extension' coding methodology for coding high fidelity signals, which allows audio content providers to include a single audio bit stream that is compatible with different types of decoders resident in the consumer base. The core bit stream will be decoded by the older decoders which will ignore the extension data, while newer decoders will make use of both core and extension data streams giving higher quality sound reproduction. This approach will satisfy both the existing customer base who wishes to keep their existing decoders and those who wish to purchase a new decoder that is capable of reproducing the higher fidelity signal.

Figure 4:
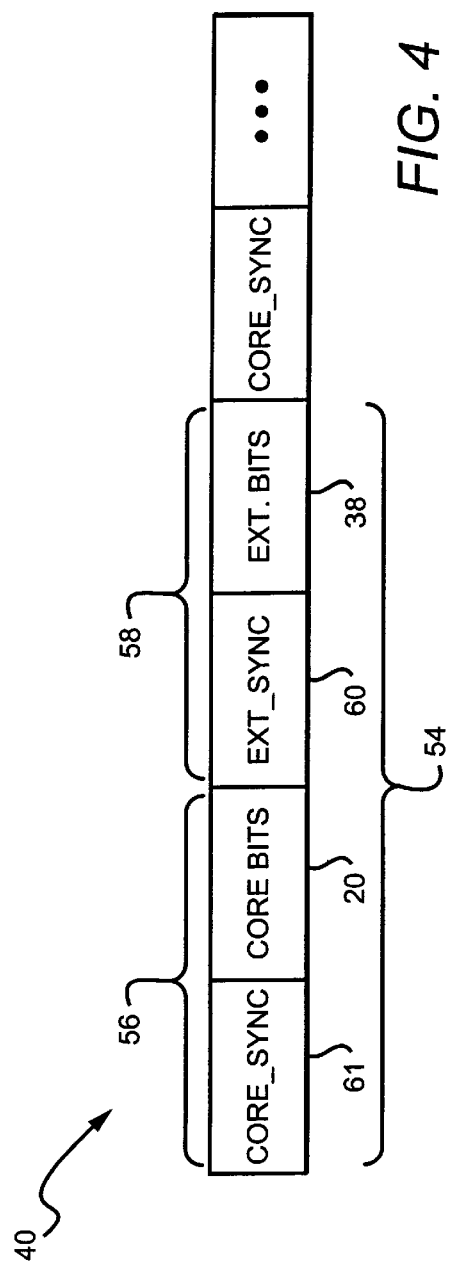
FIG. 4 is a diagram illustrating the bit stream format for a single frame of core plus extension audio data.

The original concept for encoding high fidelity audio in a manner that would maintain the compatibility of existing decoders with the next generation encoders was introduced by Smyth et al, "A MULTI-CHANNEL PREDICTIVE SUBBAND AUDIO CODER USING PSYCHOACOUSTIC ADAPTIVE BIT ALLOCATION IN FREQUENCY, TIME AND OVER THE MULTIPLE CHANNELS" filed May 2, 1996, Ser. No. 08/642,254, which is also assigned to DTS, Inc. As shown in FIGS. 4a and 4b of Smyth et al, the audio spectrum is initially split using a 256-tap 2-band decimation pre-filter bank giving an audio bandwidth of 24 kHz per band. The bottom band (0–24 kHz) is split and encoded in 32 uniform bands. The top band (24–48 kHz) is split and encoded in 8 uniform bands.

New decoders, designed to mirror the operations of the encoder, decode both the top and bottom bands and then reconstruct the high fidelity audio signal using a 256-tap 2-band interpolation filterbank. The system exhibits a unity gain frequency response over the entire 48 kHz bandwidth as desired.

Figure 1:
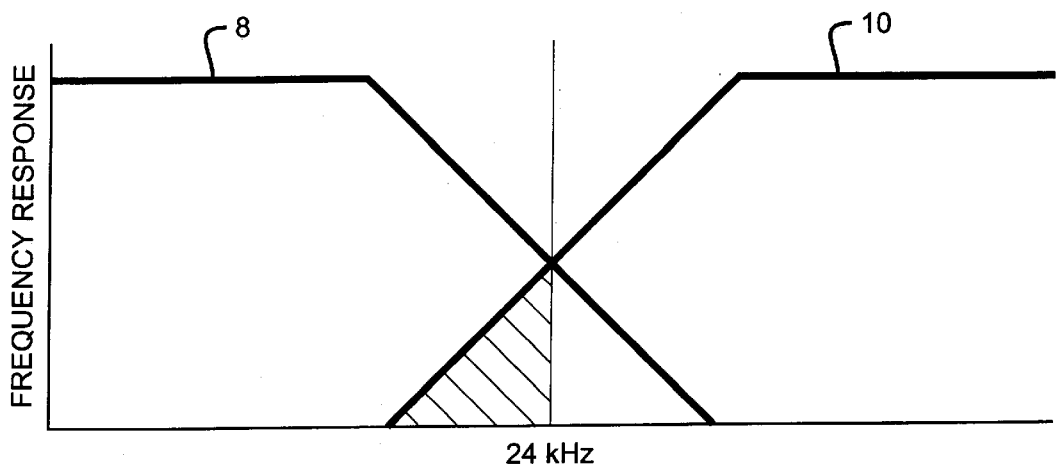
FIG. 1 is a plot of the 2-band decimation filterbank's frequency response used to separate the base and high frequency bands for coding in an earlier approach.

Older decoders, in existence prior to the described high fidelity encoding techniques, decode only the bottom band to produce a baseband audio signal. In this sense the system does maintain compatibility with the existing decoders. However, as shown in FIG. 1 herein, the frequency response 6 of the 2-band decimation pre-filter bank causes an aliasing problem around 24 kHz when only the core is decoded. The frequency responses 8 and 10 of the bottom and top bands, respectively, crossover in their respective transition regions at 24 kHz in order to provide the unity gain response for the core plus extension coder. However, in a core only decoder the portion of the bottom band frequency response 8 above 24 kHz is aliased down. As a result, the reconstructed baseband audio signal will have a degree of corruption not found in the older baseband only codec systems. Therefore, the coding system does not maintain 'true' compatibility with existing decoders. Furthermore, this approach constrains any additional bits to be allocated to the top band, which in many cases may be suboptimal.

Generalized Core Plus Extension Framework

The general processes for the encoding and decoding are depicted in FIGS. 2–7. To create the extension bit stream (FIG. 2) the analog audio 12 is fed to an analog anti-aliasing LPF 14, which band limits the signal. The band-limited signal is sampled into a discrete/digital audio signal 16. The cut-off frequency for LPF 14 must be less than one-half the sampling rate to satisfy the Nyquist criteria. For example, for the extended 96 kHz sampling rate a 48 kHz cut-off is suitable.

The digital audio signal 16 is fed to the core encoder 18 (AC3, MPEG, DTS etc) and encoded at a particular bit rate. The sampling rate and bandwidth of the audio signal may, in some cases, need to be adjusted through low pass filtering and down sampling to match the core encoder. For simplicity the audio input shown in the diagrams is assumed to be single channel or multi-channels. In the case of multi-channel inputs, the subtraction and summation processes are carried out for each channel. This core bit stream 20 is held in the packer 22 prior to generating the extension data. The core bit stream is also fed back to a core decoder 24, which is compliant with those residing in existing consumer playback equipment.

The resulting reconstructed core audio signals 26 are next subtracted 28 from a delayed version 30 of the original input signals 16. The delay 32 is made to match that of the core encoder/decoder latency such that exact time alignment of the decoded core audio and the input audio signals is achieved. This difference signal 34 now represents components in the original input signals 16 absent from the signal coded in the core bit stream 20 either higher resolution or higher frequency. The difference signals are then encoded by an extension coder 36 suitably using standard coding techniques such as subband coding or transform coding, producing an extension bit stream 38. The extension bit stream and the core bit stream are time aligned and multiplexed to form a composite stream 40 or they can be held or transmitted as separate streams depending on the application.

Figure 3A:
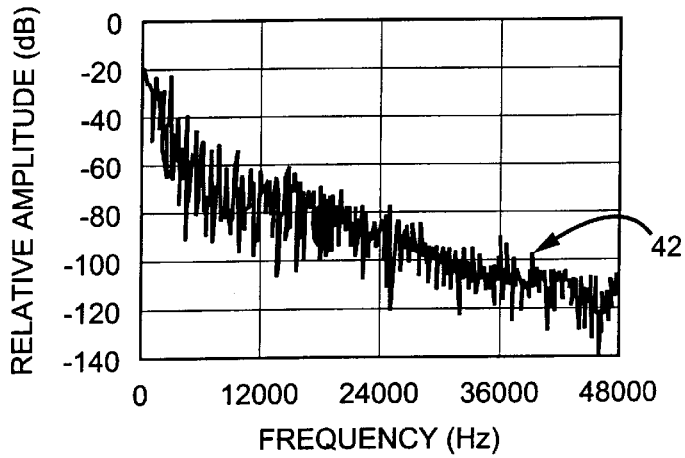
FIGS. 3a and 3b are, respectively, plots of the frequency spectra of the input audio and coded core and the difference signals.
Figure 3B:
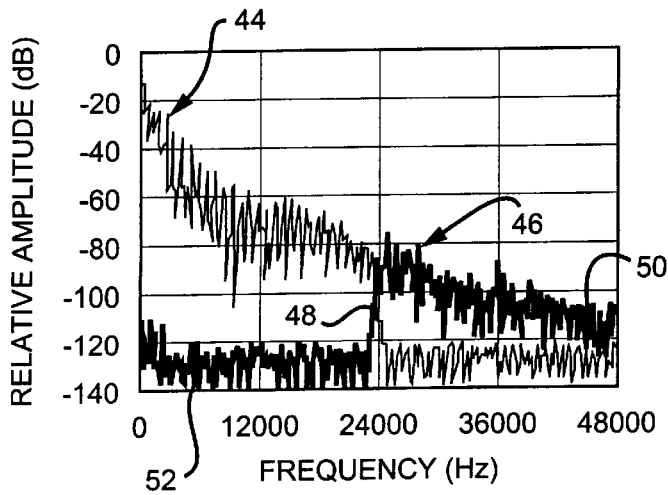
Figure 2:
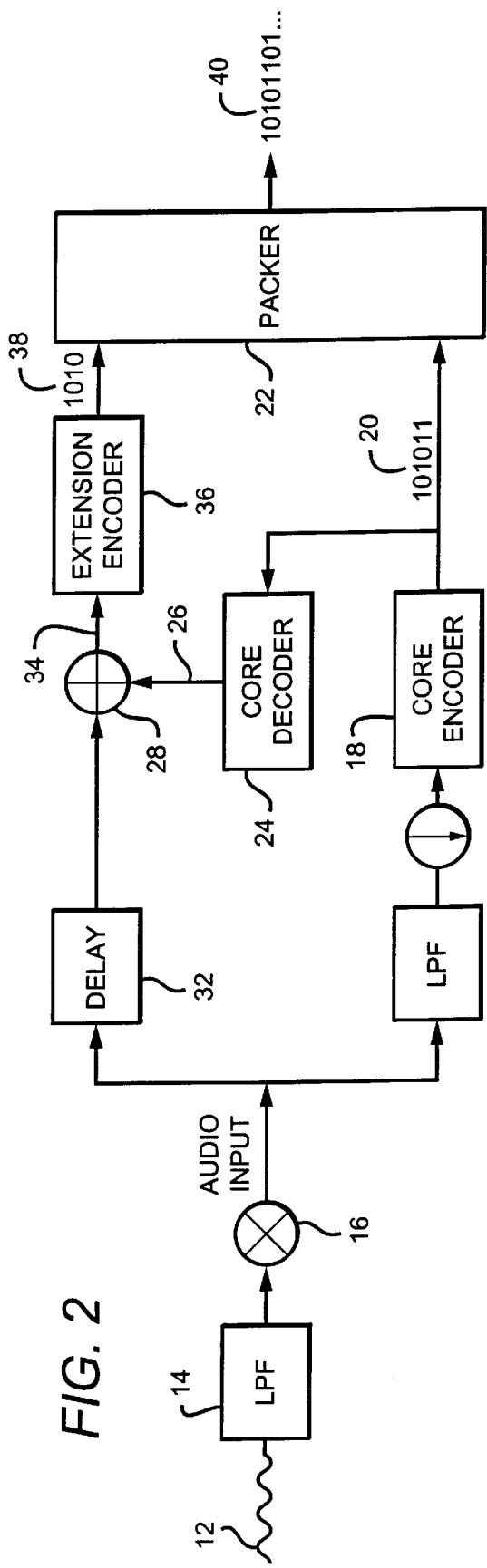
FIG. 2 is a block diagram of an encoder that embodies the generalized core plus extension framework of the present invention.

The concept behind the process of extending the frequency spectrum and lower the noise floor is further illustrated in FIGS. 3a and 3b. FIG. 3a shows a snap shot of the frequency spectrum 42 of a 96 kHz sampled audio input signal. The audio clearly contains frequency components out to 48 kHz. Trace 44 in FIG. 3b shows the spectrum of the signal after decimation and core encoding. The audio frequencies have been filtered out above 24 kHz and the sampling rate has been dropped to 48 kHz by the decimator to match the core coder. Trace 46 depicts the spectrum of the difference signal before entering the extension encoder. Clearly the extension coder is able to concentrate its data resources on those parts of the spectrum not represented by the core coder, i.e. the transition band 48 around 24 kHz and the high frequency extension 50 from 24 kHz to 48 kHz. In addition bits can be allocated to the residual core signal 52 to reduce the noise floor of the core bandwidth. The special cases to follow investigate those applications in which the extension bits are allocated to (1) extend the resolution of the core signal, (2) extend both the core resolution and high frequency content of the signal, and (3) extend only the high frequency content. Fore each of these, the coding system can be configured in a "black box" approach where only the delay associated with the core encoding system need be known or in an "open box" approach to take advantage of a particular core coding architecture.

In order to maintain backward compatibility with the core-only decoders, the single composite bit stream 40 carrying the core and extension audio data, 20 and 38 respectively, are also formatted in a core plus extension manner. Such a bit stream is a sequence of synchronized frames 54, each consists of two fields: core field 56 and an extension field 58 (see FIG. 4). A core-only decoder detects a synchronization word (CORE_SYNC) 61 and decodes the core bits 20 in core field 56 to produce core audio and then ignores the extension field 58 by jumping to the beginning of the next frame to decode the next frame. An extension decoder, however, can decode the core bits and then check if the synchronization word (EXT_SYNC) 60 for the extension bits presents. If not, the decoder outputs core audio and jumps to the beginning of the next frame to decode the next frame. Otherwise, the decoder proceeds to decode the extension bits 38 in extension field 58 to produce extension audio and then combine it with the core audio to produce high quality audio. The core bits define a noise floor for the reconstructed core audio signal across its bandwidth. The extension bits further refine (lower) the noise floor across the core bandwidth and define the noise floor for the remainder of the audio bandwidth.

Figure 5A:
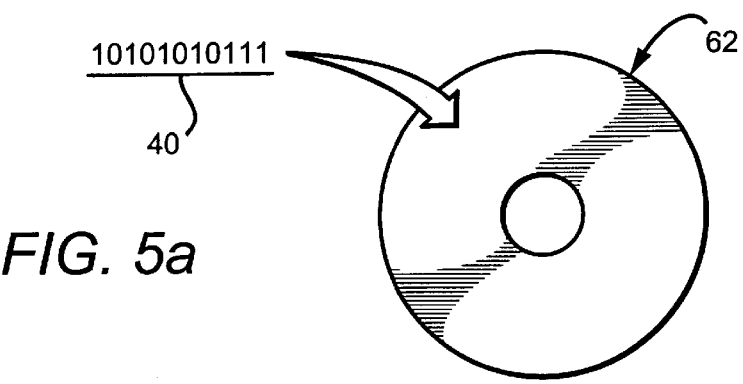
FIGS. 5a and 5b illustrate, respectively, a physical media and a broadcast system for delivering a single bit stream to the decoder.
Figure 5B:
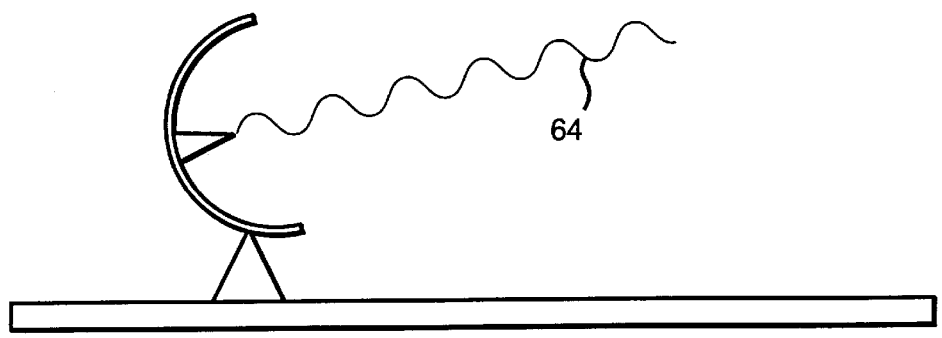
Figure 6:
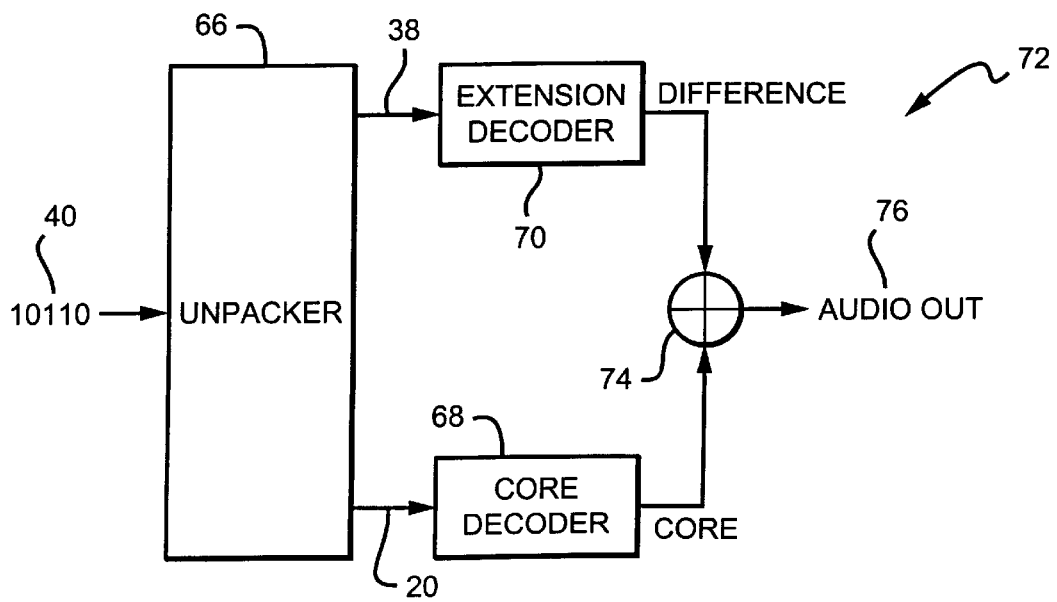
FIG. 6 is a block diagram of a decoder that is compliant with the core plus extension coder shown in FIG. 2.

As shown in FIGS. 5a and 5b, the composite bit stream 40 is encoded on or broadcast over a transmission medium such as a CD, a digital versatile disk (DVD), or a direct broadcast system. As shown in FIG. 5a, a single composite bit stream 40 is written onto a portable machine readable storage medium 62 such as a CD, DVD or other digital storage device using well known techniques. As shown in FIG. 5b, the composite bit stream 40 is embodied in a carrier wave 64 that is then broadcast over a satellite, cable or other telecommunications system.

To decode the core and extension bit streams (FIG. 6), unpacker 66 unpacks the composite bit stream 40 and directs the core and extension bit streams 20 and 38 to their respective decoders 68 and 70. Decoder 72 then sums the outputs 74 to reconstruct the high fidelity audio signal 76. In the case that a playback device does not have the extension decoder resident (as would be the case in old equipment) the extension bit stream is simply ignored and the core bit stream decoded to produce the core quality audio signals. In the decoding example, it is assumed that the delays of the core decoder and the extension decoder are the same. As will be addressed later, differences in the delays can be accommodated by adding additional delay stages either in the decoder or encoder.

Figure 7:
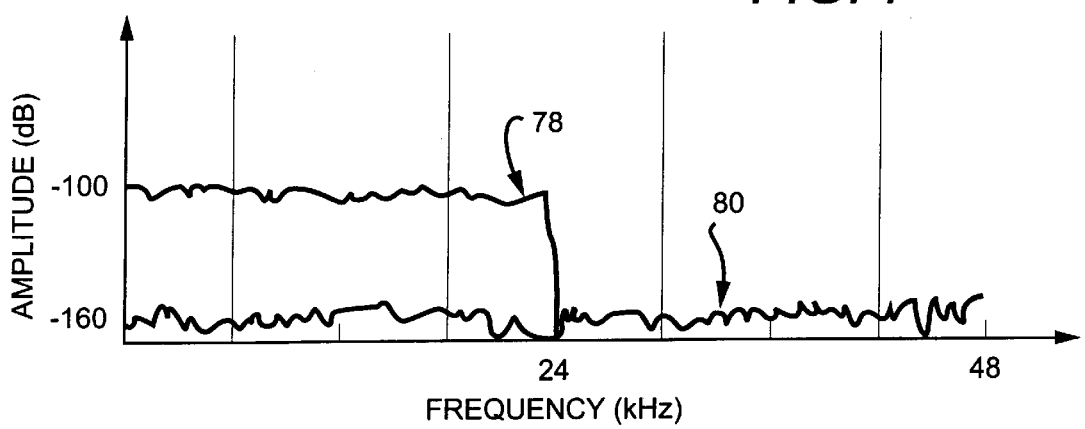
FIG. 7 is a plot of the frequency spectrum of the reconstructed audio signal for a multi-tone test signal.

The advantages of the core plus extension coding topology are clearly shown in FIG. 7, which plots the core only and core plus extension frequency spectra 78 and 80, respectively, in response to a multi-tone test signal. In this particular application, the audio system produces a core only reconstructed audio signal that has a noise floor of approximately −100 dB from DC to 24 kHz. As will be discussed in more detail later, this core only response may be marginally better than the core only signals produced by the older systems due to the difference in the analog anti-aliasing filter used in the older systems and the digital decimation filter used in the new coders. Comparatively, the audio system (special case number 2) produces a core plus extension audio signal that reduces the noise floor of the core signal to approximately −160 dB and extends the signal bandwidth to 48 kHz at a noise floor of approximately −60 dB. Note, a higher noise floor is more tolerable at higher frequencies where the ear is less sensitive.

High Resolution Extension Framework

Figure 8B:
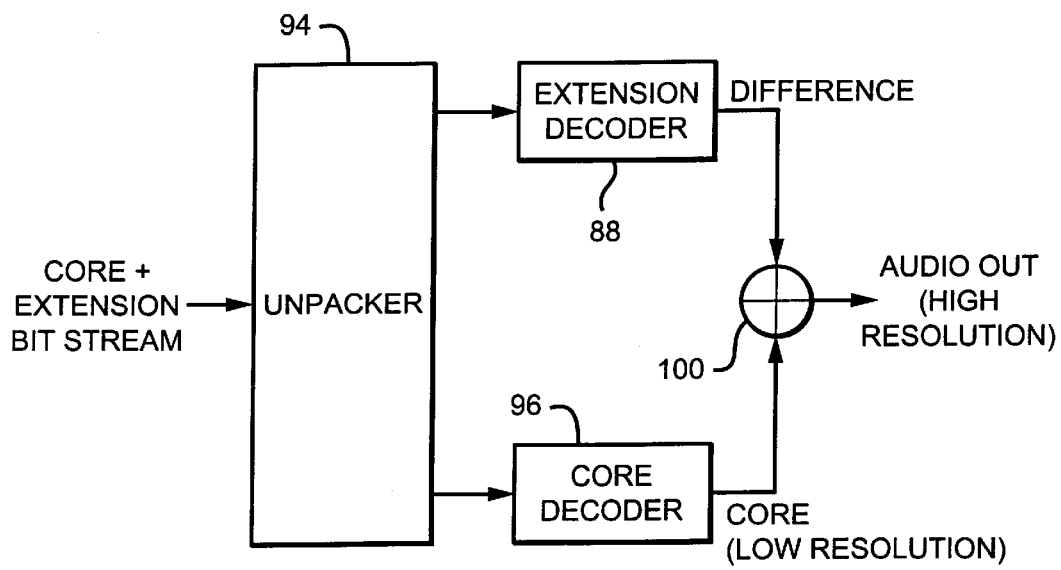
FIGS. 8a and 8b are, respectively, block diagrams of an encoder and a decoder that embody a high-resolution extension framework.
Figure 8A:
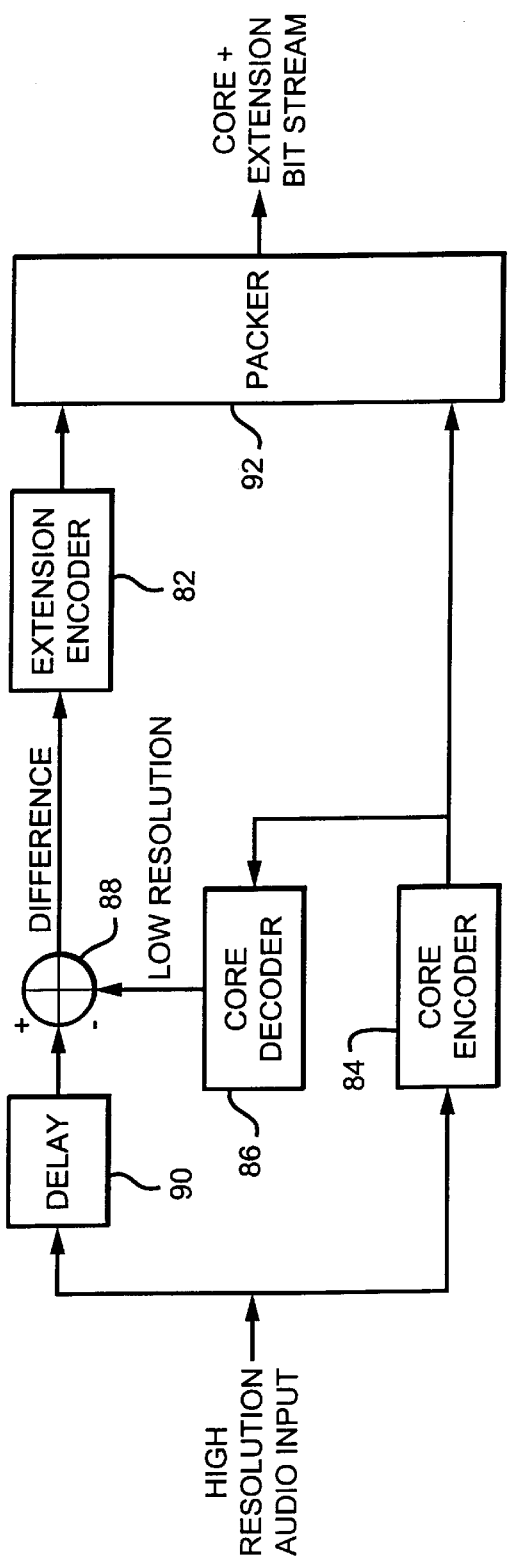

FIGS. 8a and 8b illustrate the encoding and decoding processes to improve only the coding resolution of the core process, i.e. reduce the coding error in the decoded audio output signals, without extending the bandwidth of the output audio signal. Since the bit rate of existing coding schemes (AC3, MPEG, DTS) are fixed, if a higher coding resolution is required it would normally require the use of a completely different, non-compatible, coder to encode the audio signals.

In the current scheme the existing core encoder 84 is used to provide the best coding resolution possible operating within the bit rate constraint of the existing decoder (for AC3 this would be 640 kbit/s: for MPEG 768 kbit/s: for DTS 1536 kbit/s). To improve the coding resolution further, i.e. reduce the coding error, the encoded core signal is decoded (86) to form a reconstructed core signal, which is subtracted (88) from the input signal, which is delayed (90) in order to effect an exact time alignment between these signals. The extension encoder 82 encodes the difference signal using some arbitrary coding process. Packer 92 packs the core and extension bits into a composite bit stream as described above. In this case the sampling frequency and the audio bandwidth are the same in both the extension and core encoders 82 and 84, respectively. Note, if the high fidelity 96 kHz input audio is provided it must be low pass filtered and down sampled to match both coders.

As shown in FIG. 8b, to decode the signal an unpacker 94 unpacks the composite bit stream and routes the core and extension bit streams to the separate decoder processes 96 and 98, respectively, with the output of each being summed together 100. If the extension decoder is not present then the core decoder output is used directly. In this example, the extension bit stream can be considered as a mechanism for improving the signal-to-noise ratio of the output audio signal, that is, by adding the output of the extension decoder the coding noise floor is reduced. The level of reduction will depend on the bit rate allocated to the extension bit stream.

Figure 9:
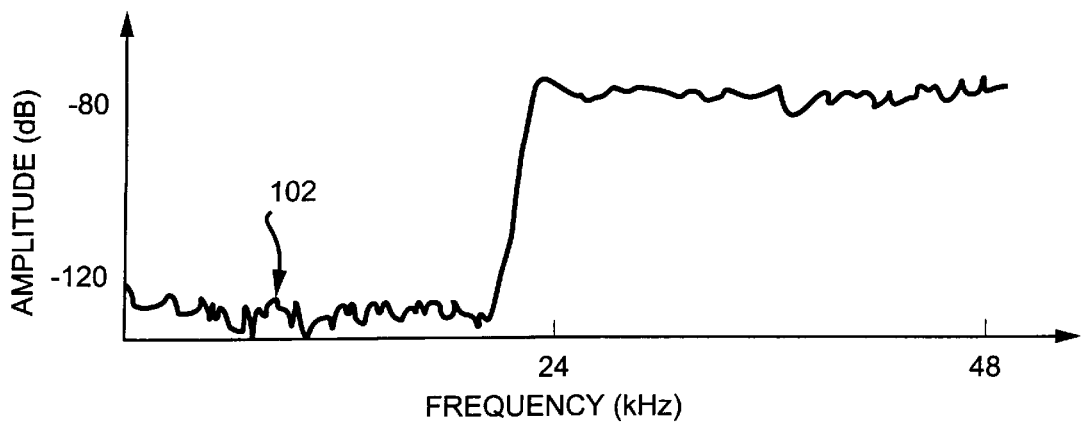
FIG. 9 is a plot of the frequency spectrum of the difference signal for the high-resolution extension framework.

FIG. 9 shows a snap shot of the frequency spectrum 102 of the difference signal before entering the extension coder. The core encoding process has a coding error that creates a noise floor across the 0 to 24 kHz bandwidth. The larger amplitude error right at 24 kHz is attributable to the transition bandwidth of the anti-aliasing filter. The extension coder allocates its available bits to reduce both the coding and transition bandwidth errors. Most allocation schemes allocate more bits to larger errors such as the transition bandwidth and less to smaller errors in order to optimize the overall performance.

Figure 10:
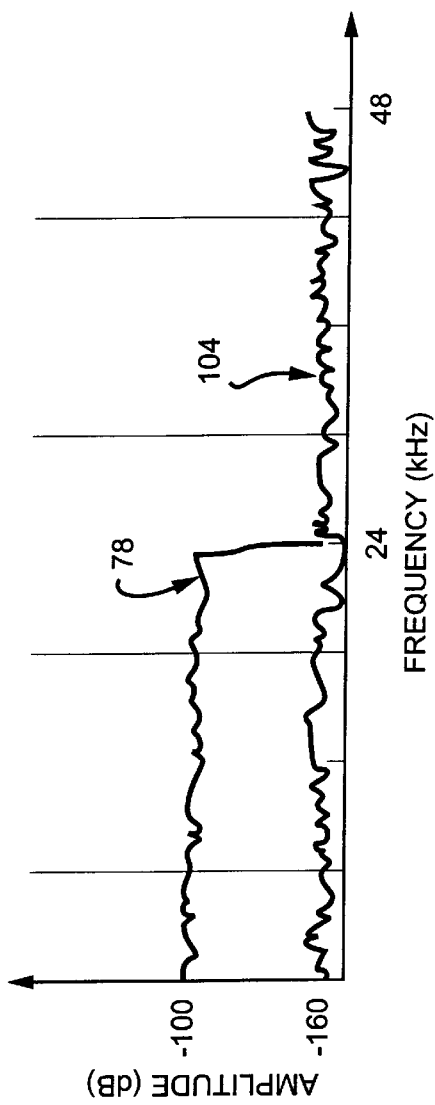
FIG. 10 is a plot of the frequency spectrum of the reconstructed audio signal for a multi-tone test signal for the high-resolution extension framework.

As shown in FIG. 10, the noise floor has been shifted down substantially, −100 dB for the core only frequency response 78 versus −160 dB for the core plus extension response 104 and extended through the transition band, by increasing the core bit rate of 1536 bits/sec to 2048 bits/sec and allocating the additional bits to the extension coder. Note, these bit rates are only examples of what may be used with an existing DTS encoder system. The −160 dB noise floor is unachievable by other available coders and represents a significant improvement in audio fidelity.

High Frequency Extension Framework

Figure 11A:
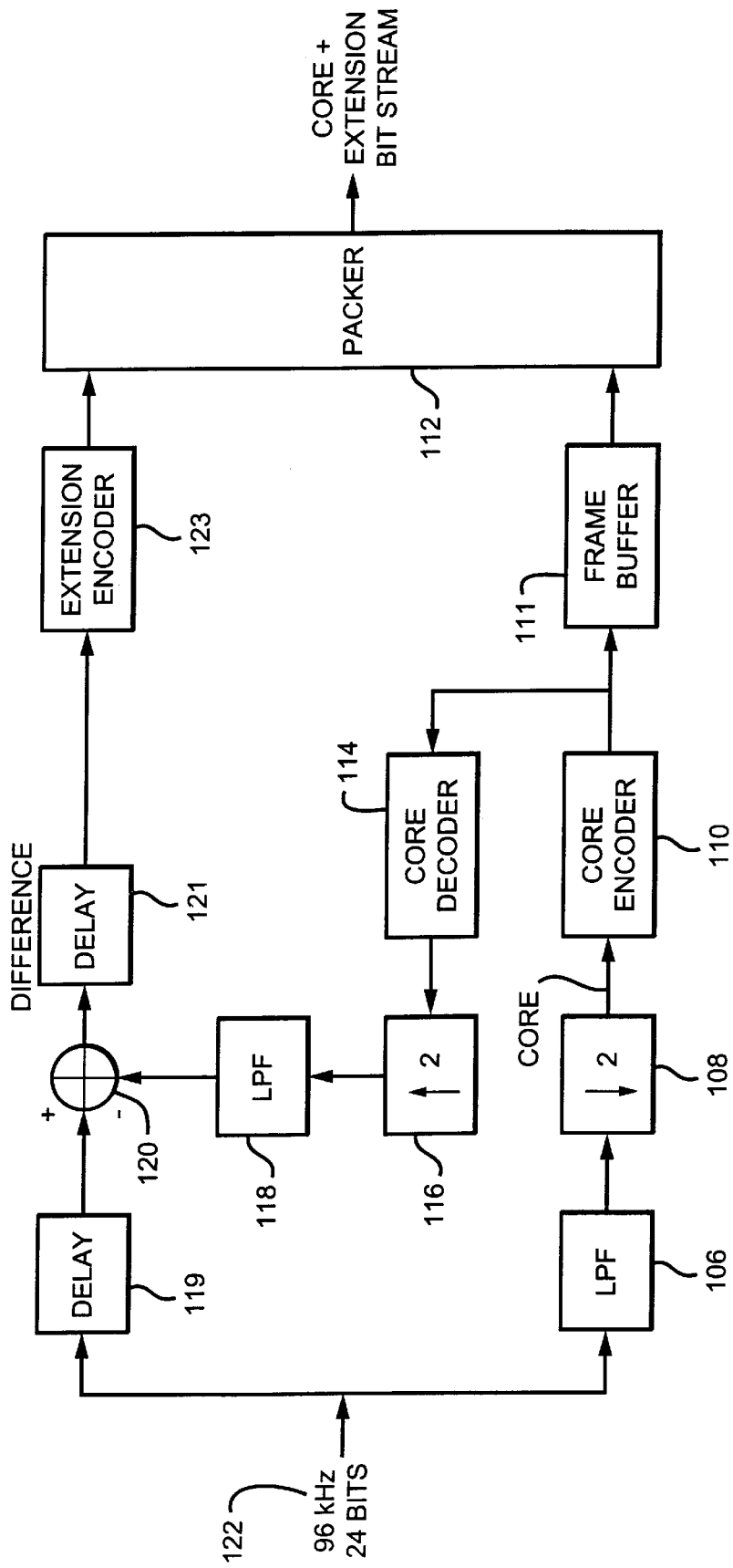

FIGS. 11a and 11b describe a coding framework that allows the extension bit stream to carry high frequency audio information not represented by the core coding system. In this example the digital audio is represented by 24-bit PCM samples with a 96 kHz period. The digital audio is first low-pass filtered using a linear phase FIR filter 106 with an integer delay to remove signal components above 24 kHz. Note that the cut-off frequency of this digital filter is the same as the analog anti-aliasing filter in the existing core only audio coders. Since digital filters tend to exhibit a narrower transition band then their analog counterparts, the core only signal can actually be marginally better than the core only signal in existing systems.

The filtered signal is then decimated by a factor of two 108, resulting in a effective 48 kHz sampled signal. The down sampled signal is fed to the core encoder 110 in the normal fashion and the resulting bit stream placed in a frame buffer 111 that delays the bit stream by at least one frame. The delayed bit stream is then placed in the packer 112. The down sampled signal is also fed to the core decoder 114 to reconstruct a 48 kHz sampled digital audio stream that has a coding error. Before it can be subtracted from the original 96 kHz input audio signal, it must be first up-sampled 116 by a factor of 2 and then low-pass filtered to remove the interpolation aliasing. Again this filtering is suitably achieved using a linear phase FIR 118 with integer sample delay. Hence this signal still carries only the audio information held in the core bit stream, i.e. it does not contain any audio frequency components above 24 kHz. The reconstructed core signal is then subtracted 120 from a delayed (119) version of the input signal 122 to create the difference signal, which is passed through a delay 121 and encoded with a 96 kHz sampling encoder 123 to produce the extension bit stream.

The decoding process is similar to those described earlier. As depicted in FIG. 11b, an unpacker 124 unpacks the composite bit stream and feeds the core and extension bit streams to their respective decoders 126 and 128. In the case that the extension decoder does not exist, the reconstructed audio is output directly (24 bit 48 kHz PCM in the illustration). In the case that an extension decoder is resident on the player, the decoded core audio is up-sampled to 96 kHz (130), low-pass filtered (132) and summed (134) with the output of the extension decoder.

The concept behind this process was first illustrated in FIGS. 3a and 3b with reference to the general core plus extension framework. FIG. 3a shows a snap shot of the frequency spectrum of the 96 kHz sampled audio input signal. The audio clearly contains frequency components out to 48 kHz. In FIG. 3b trace 44 shows the spectrum of the signal after decimation and core encoding. The audio frequencies have been filtered out above 24 kHz and the sampling rate will be dropped to 48 kHz by the decimator because the core coder is unable to operate at the higher sampling frequency. Trace 46 depicts the spectrum of the difference signal before entering the extension encoder. Clearly it is able to concentrate its data resources on those parts of the spectrum not represented by the core coder, i.e. between 24 kHz and 48 kHz.

A bit allocation scheme that allocates some of the extension bits to the core region and some to the high frequency spectrum was first illustrated in FIG. 7. As shown, this both extends the bandwidth of the output audio signal and reduces the noise floor in the 0–24 kHz region. This example assumes that there are additional bits to allocate to the extension coder. An alternative application, as depicted in FIG. 12, would keep the total number of bits fixed at the existing levels and allocate them between the core and extension regions. Clearly an improvement in high frequency performance 136 is traded off against a noise floor 138 that is higher than the unaltered core noise floor 78 up to 24 kHz. In another approach, any additional bits can be allocated solely to the higher frequency spectrum while leaving the noise floor in the core region alone. Because the error in the transition band around 24 kHz is fairly large, the high frequency spectrum is preferably defined to include the transition band.

In this last case, it is assumed either that the noise floor provided by the core encoder is good enough or that improvement in the high frequency spectrum is more important than lowering the noise floor. In either case none of the extension bits are allocated to reduce the coding error associated with the reconstructed core signal. As such the encoding process can be simplified to reduce both the number of computations required and the delay, which can reduce the cost and complexity of the audio equipment, without affecting the decoder.

Figures 13, 14A:
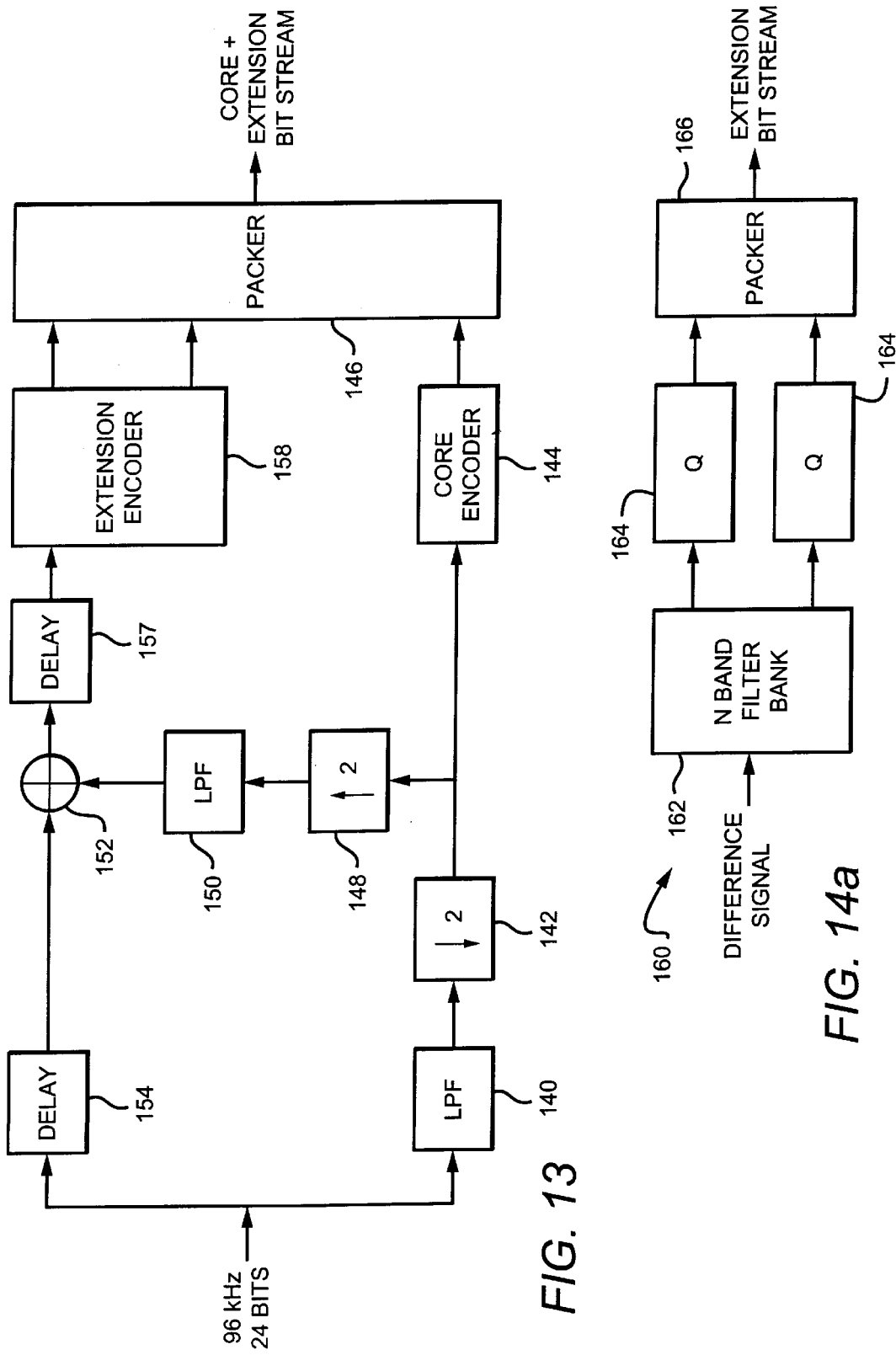
Figure 16:
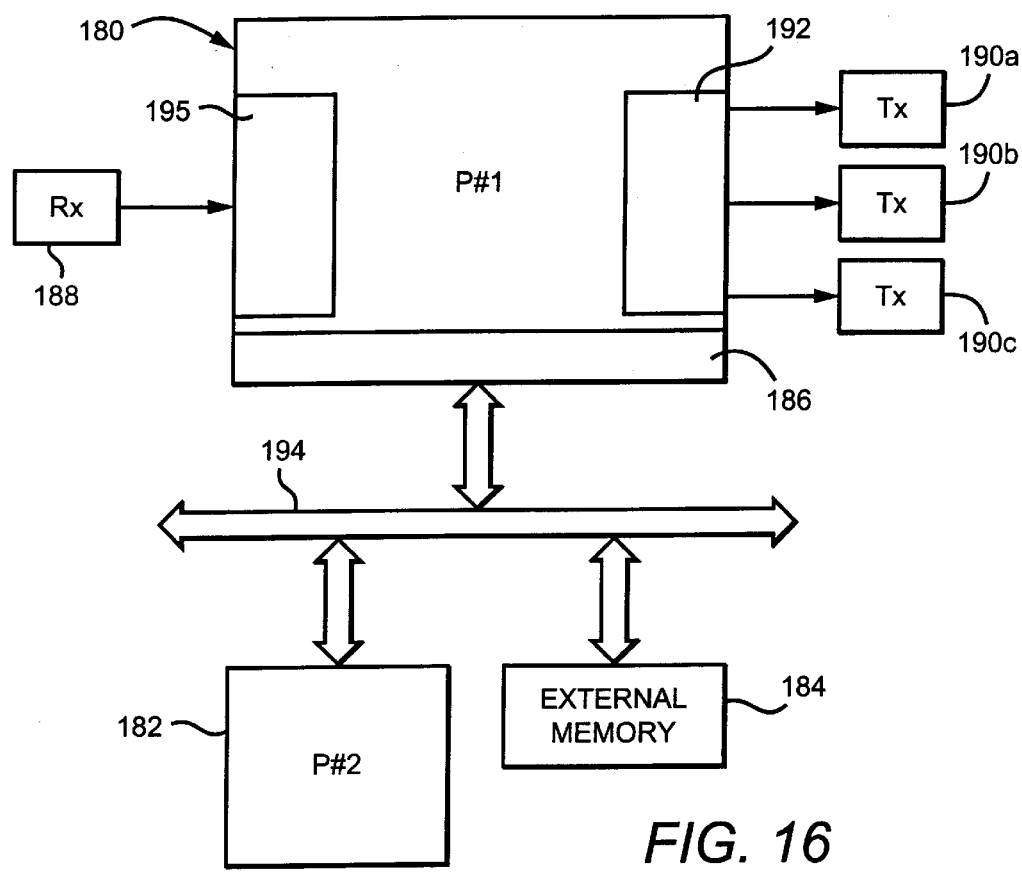
FIG. 16 is a block diagram of a black-box hardware architecture.

As shown in FIG. 13, this is accomplished by first low-pass filtering the digital audio using a linear phase FIR filter 140 with an integer delay to remove signal components above 24 kHz. The filtered signal is then decimated by a factor of two 142, resulting in an effective 48 kHz sampled signal. The down sampled signal is then fed to the core encoder 144 in the normal fashion and the resulting bit stream placed in the packer 146. The down sampled signal is then up-sampled 148 by a factor of 2 and low-pass filtered 150 to remove the interpolation aliasing on the reconstructed signal. Again this filtering is achieved using a linear phase FIR with integer sample delay. Hence the reconstructed signal still carries only the audio information held in the core bit stream, i.e. it does not contain any audio frequency components above 24 kHz, but without coding error. The reconstructed signal is then subtracted 152 from a delayed (154) version of the input signal to create the difference signal which is delayed (157) and encoded with a 96 kHz sampling encoder 158 to produce the extension bit stream.

The difference between this scheme and that in FIG. 11a is that the chain of core encoder and decoder is by-passed in the process to generate the difference signal. The trade-off is that the noise floor in the frequency band covered by the core encoder cannot be improved because the coding error in the core encoder is not reflected in the difference signal. Accordingly, the extension encoder should not allocate bits to the lower subbands away from the transition band of the decimation and interpolation filters.

Filter Property Issues

The purpose of the decimation anti-aliasing low-pass filter (LPF), which filters the signal prior to the core encoding, is to remove signals which cannot normally be represented by the core algorithm. In other words, the decoder resident in the consumer equipment is not programmed to make use of these frequencies. To avoid aliasing effects and possible degradation in sound quality, this filter will normally roll-off well before the transition point. However, the specification of this filter, i.e. its ripple, transition bandwidth, and stopband attenuation, may be adjusted by the user to obtain the necessary quality standard.

The purpose of the interpolation anti-aliasing filter is simply to ensure that the interpolation aliasing is efficiently attenuated such that the level of the aliasing does not interfere with the overall quality. The filter may be simply a replica of the decimation anti-aliasing filter. However, it is likely that the complexity of the decimation filter will be large in order to ensure the quality of the core signal. As a result it may be desirable to reduce the size of the interpolation filter to simplify the computation load at the encoder and/or decoder.

Normally it will be desirable to keep the filter characteristics of the interpolation filters at both the encoder and decoder the same. This ensures the delays and responses are exactly matched such that the summation at the decoder will exactly reverse the difference processing in the encoder. On occasions, it may be desirable to reduce the computational complexity of the decoder interpolation filter. While this will cause a slight mismatch between the encoder and decoder interpolation processes, it is possible that the difference can be made small with a appropriate filter design. Another issue, which is important, is the delay of these filters. If the delay is different, it must be compensated for by either adding delay in the extension chain or the core chain. Again, the purpose here is to ensure that the extension and core signals are exactly time-aligned prior to the summation.

Codec Implementations

In the coding schemes described above, the encoders/decoders for both the core and extension bit streams are arbitrary, that is, they can be any combination of sub-band coding, transform coding, etc. The general core plus extension approach can be broken into two distinct implementations. The first is a black-box approach that does not require knowledge of the algorithm and internal structure of the core codec, only knowledge of the coding delay is required. The extension encoding, however, can be made more efficient in certain cases if the nature of core encoding is known and the extension coder is designed to match it.

Black-Box Codec

The black-box approach assumes no knowledge of the internal structure of the core coder/decoder (codec), except the delays of the core encoder and decoder. The block diagrams used above to describe the general core plus extension approach also illustrate the black-box approach. As shown the core and extension encoding and decoding processes are completely separate. The only interaction occurs when forming the difference signal or summing the output signal, which occurs entirely in the time domain. Thus no knowledge of the internal structure of the core codec is required nor is the choice of the extension codec dependent on or constrained by the core codec. However, the delays must be selected such that (a) the reconstructed core signal and the input signal are exactly time-aligned before the difference signal is formed and (b) core and difference signals are exactly time-aligned before they are summed at the decoder. The currently preferred approach as illustrated in FIGS. 11a and 11b is to put all of the delays in the encoder in order to minimize the required memory in the decoder.

To time-align the input signal and reconstructed core signal, the input signal is delayed by an amount equal to:

$$Delay_{input} = Delay_{Decimation\ LPF} + Delay_{Core\ Encoder} + Delay_{Core\ Decoder} + Delay_{Interpolation\ LPF}.$$

To time-align the core and difference signals at the decoder, the Frame Buffer Delay is set equal to:

$$Delay_{Frame\ Buffer} = Delay_{Difference\ Signal} + Delay_{Extension\ Encoder} + Delay_{Extension\ Decoder}.$$

A problem with the encoder shown in 11a is excessive coding delay, which is $$Coding\ Delay = Delay_{Decimation\ LPF} + Delay_{Core\ Encoder} + Delay_{Difference\ Signal} + Delay_{Extension\ Encoder} + Delay_{Extension\ Decoder} + Delay_{Core\ Decoder} + Delay_{Interpolation\ LPF}.$$

This delay can be reduced to $$Coding\ Delay = Delay_{Decimation\ LPF} + Delay_{Core\ Encoder} + Delay_{Core\ Decoder} + Delay_{Interpolation\ LPF}$$

if the scheme given in FIG. 13 is used and the interpolation LPF is properly designed.

Black-Box Extension Coder

One example of a codec that is suitable for the black-box extension encoder 160 is shown in FIGS. 14 and 15. This codec is based on filter bank type coding technology which is essentially used by all the major audio coding systems currently in the market: DTS Coherent Acoustics, MPEG I and MPEG II use subband coding, while AC-3 and MPEG II AAC deploy transform coding. Therefore, the codec details presented here can be readily adapted for the implementation of the extension codec used in the Open-Box Implementation that are described later.

The extension encoder 160 is shown in FIG. 14(a). The difference signal is split and decimated by a filter bank 162 into N subbands. Each subband signal may be encoded using a subband coder 164 shown in FIG. 15(a). The subband bits from each subband encoder are then packed 166 as extension bits.

The decoder 168 is shown in FIG. 14(b). The extension bits are first unpacked 170 into each individual subband bits. The unpacked subband bits are then decoded by the subband decoder 172 shown in FIG. 15(b) to produce the reconstructed subband signal. Finally, the difference signal is reconstructed by running the synthesis filter bank 174 over the reconstructed subband signals.

Inside each subband encoder (FIG. 14(a)), the subband samples are grouped into subband analysis windows. The subband samples in each of such windows are used to optimize a set of four prediction filter coefficients, which are then quantized using a tree-search VQ strategy. This vector-quantized prediction coefficients are used to predict the subband signal inside each analysis window. Prediction gain is obtained as the ratio of the variance of the subband samples and that of the prediction residual. If the prediction gain is positive enough to cover the overhead of transmitting the VQ address of the prediction coefficients and the possible loss of prediction gain due to later quantization of the prediction residual, the prediction residual will be quantized and transferred. Otherwise, the prediction residual will be abandoned and the subband samples will be quantized and transferred. The use of adaptive prediction for a subband analysis window is indicated by the "prediction mode" flag in the compressed bit stream. In this way the adaptive prediction is dynamically activated whenever it is able to reduce the quantization error.

If prediction mode is on for a subband analysis window, a scale factor is calculated which is either the RMS (root mean square) or peak amplitude of the prediction residual. The prediction residual is normalized by this scale factor. If prediction mode is not on for a subband analysis window, the subband samples are analyzed for possible presence of transients. A transient is defined as a sharp or rapid transition between a low amplitude phase and a high one. If a single scale factor is used for such a window, it may be excessive for the low-level samples which precedes the transient, possibly leading to pre-echo at low bit-rate mode. In order to alleviate this problem, each analysis window is divided into up to a number of subwindows in. The position of the transition is located in the analysis window in terms of the analysis subwindows and two scale factors are calculated, one for samples in the pre-transient subwindows and the other for the post-transient subwindows. The identification number of the subwindow where the transient occurred is then packed into the encoded bit stream. Afterwards, the subband samples in each subwindow are normalized by their respective scale factors.

The scale factors are quantized logarithmically using either a 64-level (2.2 dB step) or a 128-level (1.1 dB step) root square table, depending on the bit rate. They allow for the dynamic tracking of audio over a range of 140 dB. The choice of the quantization tables is embedded in the bit stream for each analysis window.

Bit allocation across all subbands of all channels can be accomplished using a water filling algorithm for the time span of a subband analysis window. For high bit rate applications, the water filling algorithm operates on the power of the subbands. For low bit rate applications, subjective transparent coding is achieved by running psychoacoustic analysis on all channels to obtain signal to mask ratio (SMR) for the subbands and then feeding the SMRs into the water filling algorithm. At lossless or variable bit rate coding mode, bit allocation is determined by a quantization step size, which guarantees the quantization noise is below some pre-determined threshold such as half LSB of the source PCM samples. The bit allocation thus obtained is then embedded into the bit stream.

After bit allocation, the subband samples or the prediction residual is quantized and the quantization indexes are packed into the bit stream.

Psychoacoustic research has shown that, above about five kHz, the human auditory system bases its perception of space imaging more on the temporal envelop of the audio signal than on its temporal fine structure. Therefore, at very low bit rate mode, it is possible to improve the overall reconstruction fidelity by encoding only a summation of the high frequency subbands of a selected number of audio channels. Upon decoding, these high frequency subbands of the individual channels can be reconstructed by copying this sum signal and then scaling by their respective scale factors. If joint intensity coding is deployed, the sum subband samples are carried in one of the joint channels (source channel) and all other channels only carry an index to the source channel and their respective scale factors.

At low bit rate application, the scale factors, transient location, the bit allocation, or the quantization indexes may further be encoded using entropy coding such as Huffman code. In this case, the total bits actually used after entropy encoding is likely to be significantly less than the maximum bits allowed for a fixed bit rate application. In order to fully utilize the allowed maximum bits, an iterative approach is deployed whereby unused bits are incrementally allocated to the subbands starting from the lowest and ending at the highest until all unused bits are depleted.

Black-Box Decoder Hardware Implementation

One implementation of a 5.1 channel, 96 kHz, 24-bit DTS decoder, operating on dual HSARC 21065L floating-point processors is shown in FIGS. 16–20. All the processing of "core" blocks and handling of serial input/output data streams are performed in Processor #1 (P#1) 180. The majority of signal processing operations required for the extension decoding are confined to the Processor #2 (P#2) 182. This configuration allows a simple hardware upgrade path to be considered for the 96/24 "high definition" audio format. In particular for the "core" decoding only, it is sufficient to use Processor#1, which interfaces to an external memory 184 through an external port 186 and connects to an SPDIF receiver 188 and three SPDIF transmitters 190a, 190b and 190c through the output serial ports 192. Upgrade to the 96 kHz, 24-bit DTS decoder is done by connecting Processor #2 to the external memory bus 194 in a cluster multiprocessing configuration. The SHARC's on-chip bus arbitration logic allows both processors to share the common bus.

The digital stream may be available from a DVD player or from the DVD transport mechanism inside a DVD player. A SPDIF receiver is necessary to receive the digital stream and convert it to an appropriate format to feed the Rx serial port 195 of SHARC P#1. The incoming digital stream is transferred, using DMA, from Rx serial port to the data buffer in internal memory of SHARC P#1.

Figure 17:
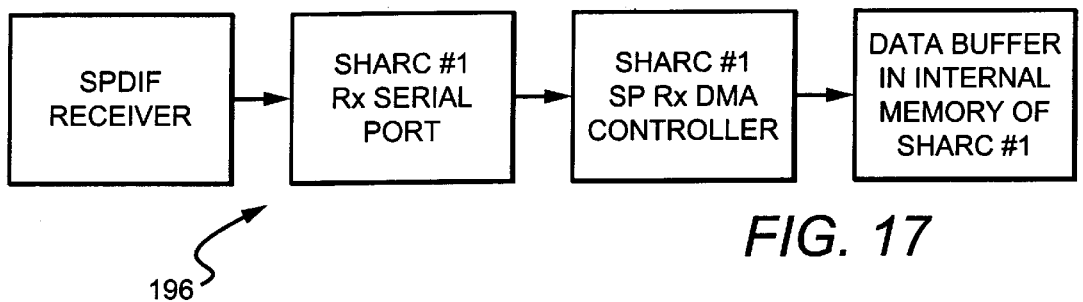
FIG. 17 illustrates the data flow from the serial input to on-chip memory of the first processor.

The block diagram 196 in FIG. 17 illustrates the incoming data stream flow. Six decoded PCM streams for left and right channels (L,R), surround left and surround right channels (SL,SR), and center and low frequency effect channels (C,LFE) are multiplexed into three output streams. Three Tx serial port DMA channels are used to transfer output streams from the data buffers in internal memory of SHARC P#1 to the appropriate transmit serial ports. Serial ports can be configured to feed any commercially available SPDIF transmitters or DACs.

Figure 18:
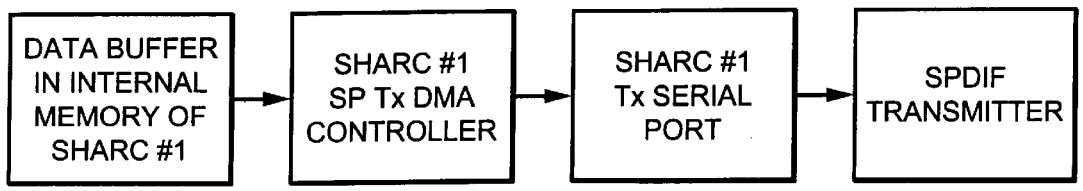
FIG. 18 illustrates the data flow from the on-chip memory of the first processor to the serial port.

The block diagram 198 in FIG. 18 illustrates the outgoing data stream flow. The cluster multiprocessing configuration enables each processor to access the shared external memory and I/O registers of both processors. The exchange of data between the two processors is performed through double buffers in shared external memory. In particular, six channels of "core" audio data from the current DTS frame are transferred from internal memory of P#1 to buffers in a block of shared external memory (say block A) using the external port DMA channel of P#1. In addition five channels of extension subband samples from current DTS frame are also transferred from internal memory of P#1 to their corresponding buffers in the same block of shared external memory. Again the external port DMA channel of P#1 is used for this transfer.

As shown in block diagram 200 in FIG. 19, during the current DTS frame the "core" and extension data from previous DTS frame are transferred from their corresponding buffers in block B of shared external memory to the internal memory of P#2. The scheduling of these transfers and toggling of memory blocks (A/B) is done by P#1 through control of I/O registers of both processors. Similarly the six channels of 96 kHz PCM audio from previous DTS frame, are transferred from the buffers in block D of shared external memory, to the internal memory of P#1 using the external port DMA channel of P#1. The block diagram 201 of FIG. 20 illustrates this data stream flow. The scheduling of these transfers and toggling of memory blocks (C/D) is again done by P#1 through control of I/O registers of both processors.

Open-Box Codec I

Figure 21A:
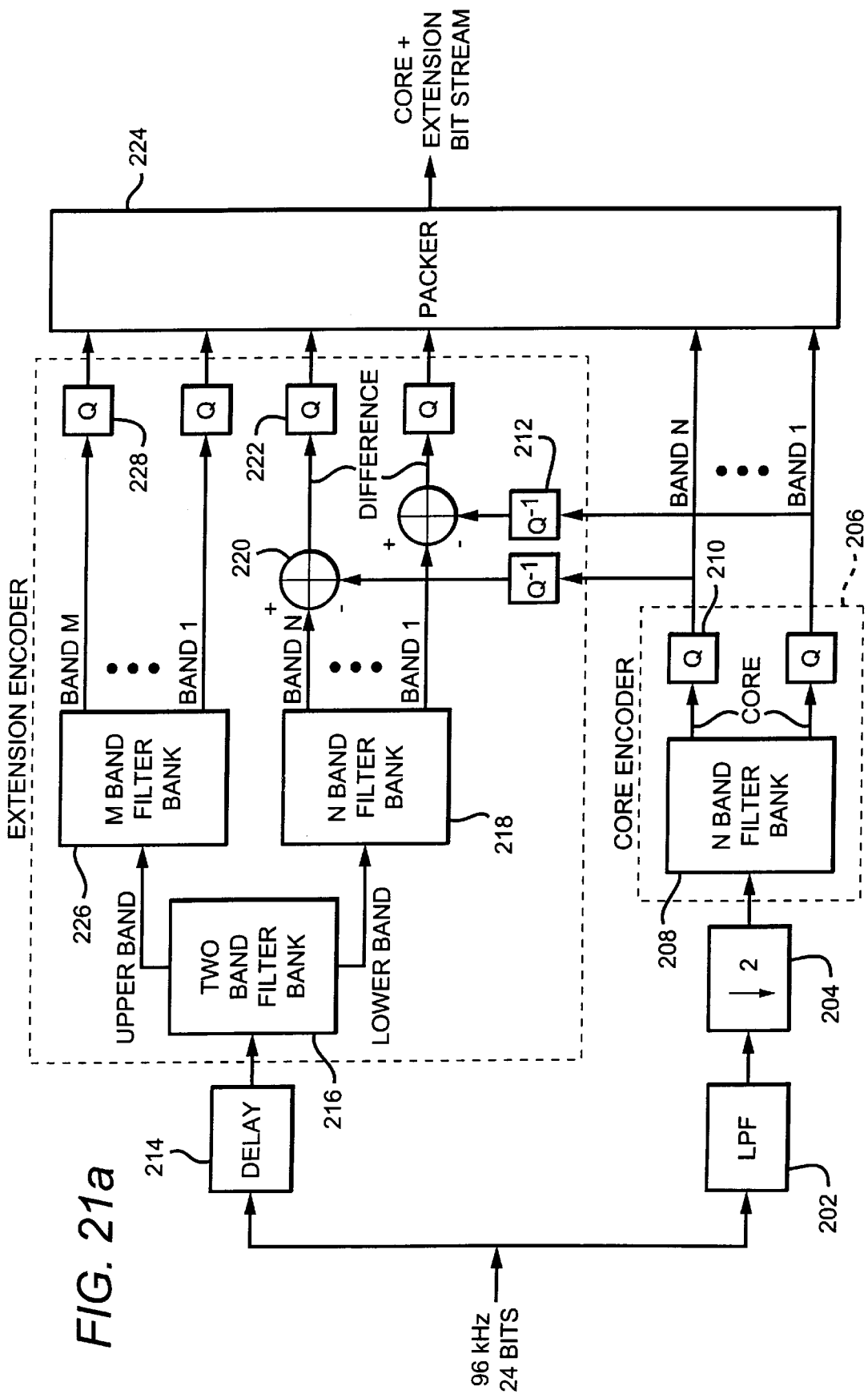
FIGS. 21a and 21b are respectively, block diagrams of an open-box encoder and decoder.
Figure 21B:
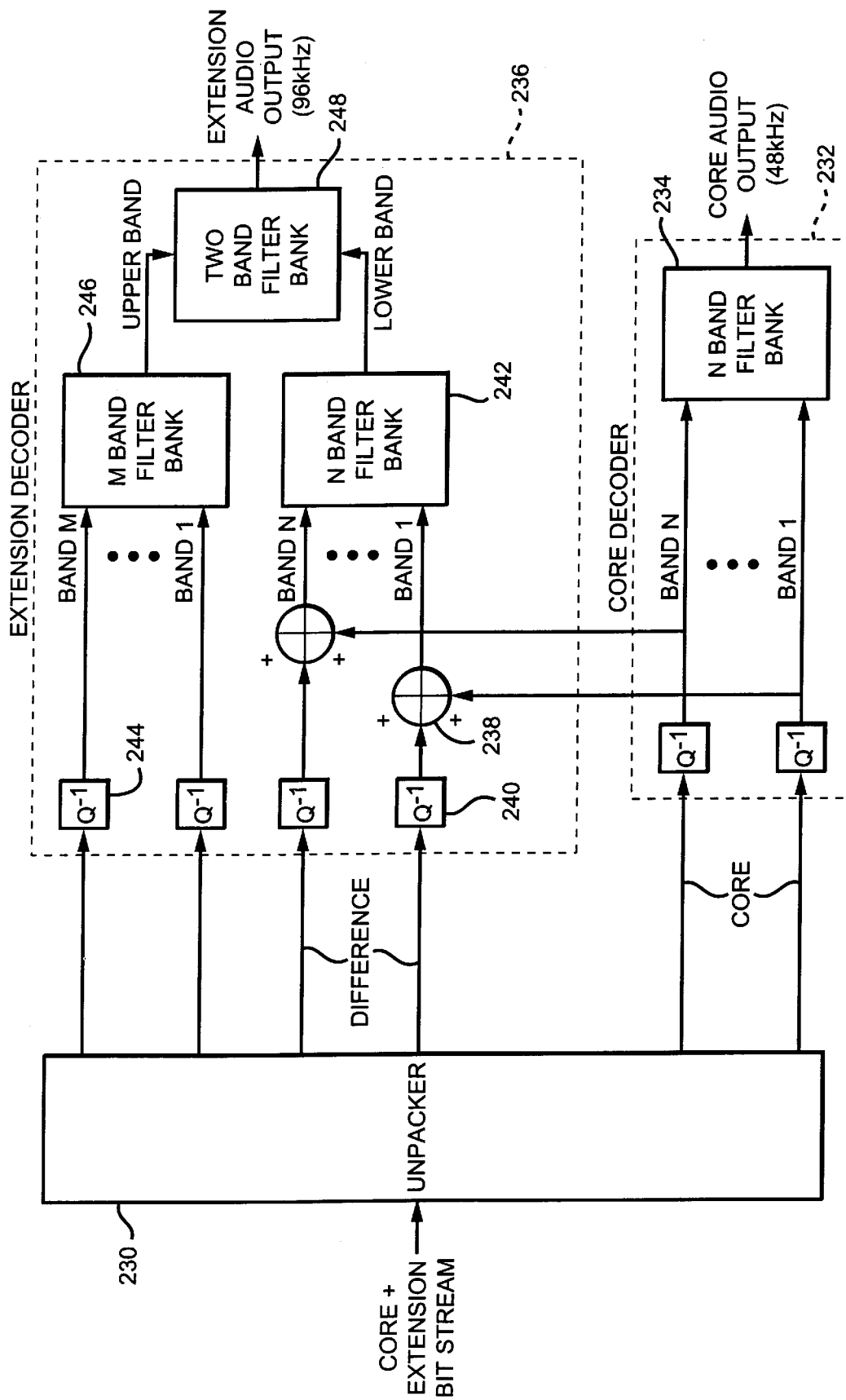
Figure 22A:
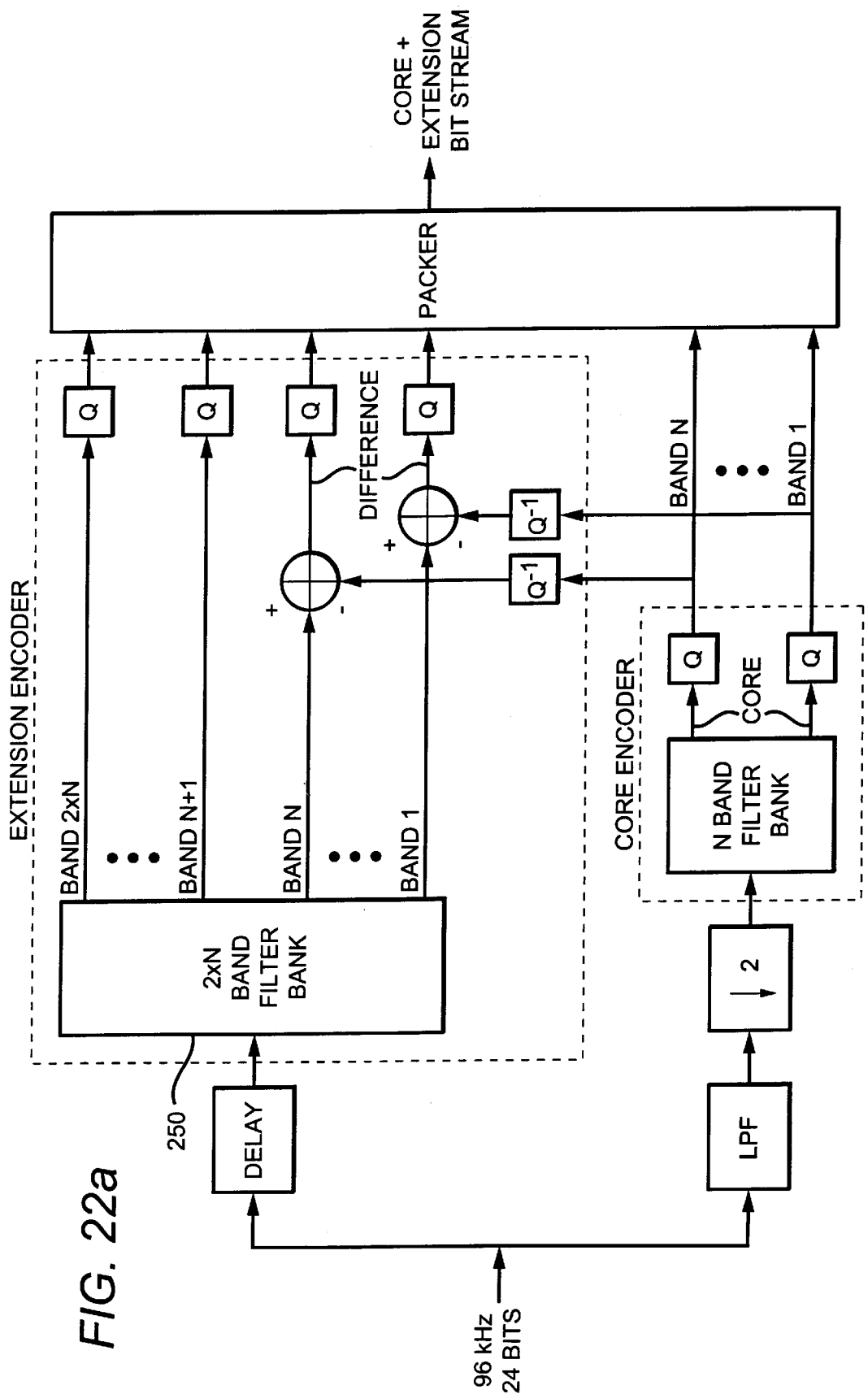
FIGS. 22a and 22b are respectively, block diagrams of another open-box encoder and decoder.
Figure 22B:
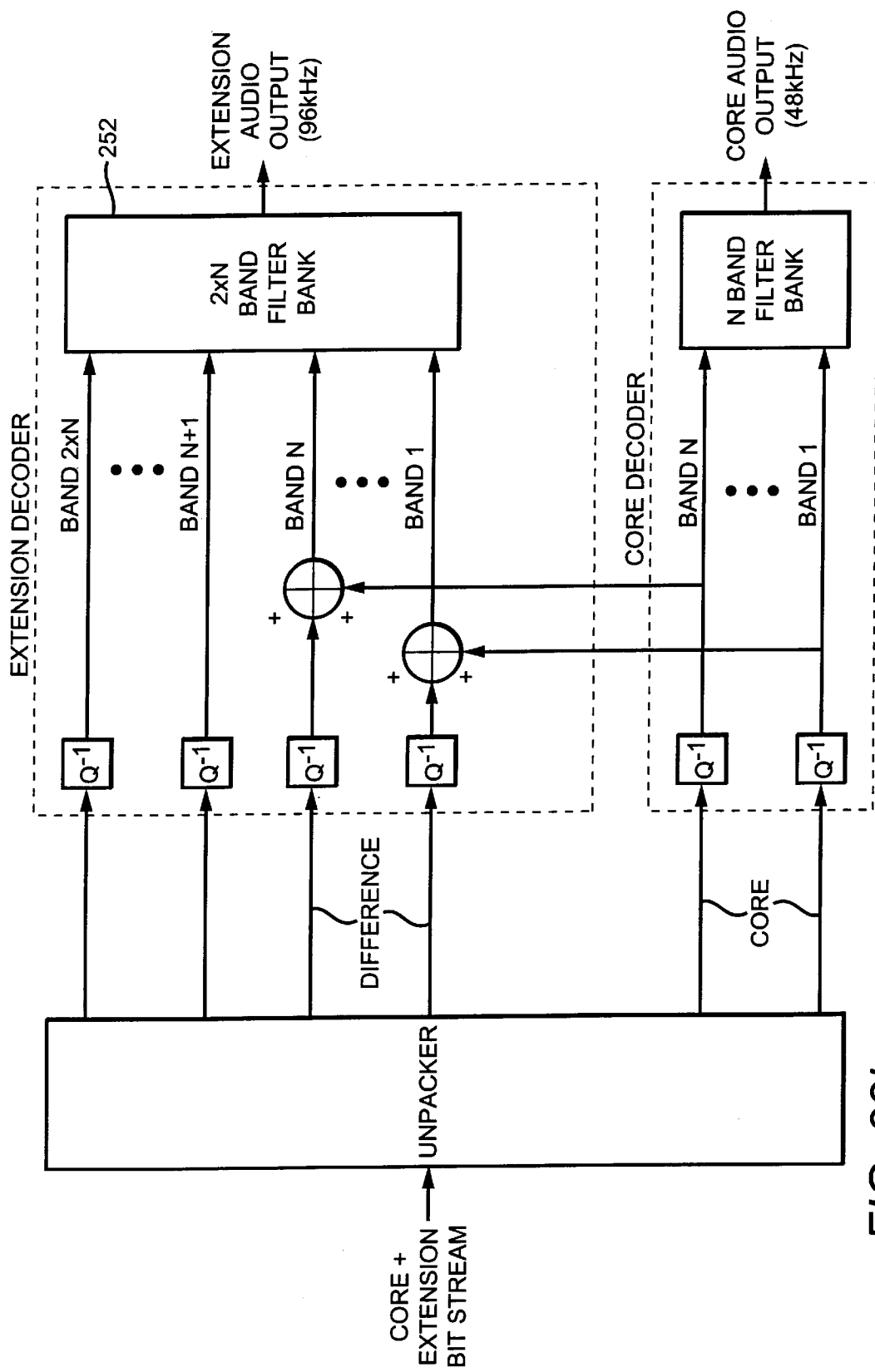

The open-box implementation requires knowledge of the internal structure of the core codec. The encoder examples shown in FIGS. 21 and 22 are for core encoders that employ coding techniques using a filter bank approach. They include, but are not limited to, subband coding (DTS Coherent Acoustics, MPEG I and MPEG II) and transform coding (Dolby AC-3 and MPEG II AAC). Knowing the internal structure of the core code, the extension codec is selected and designed such that its response over the core bandwidth, e.g. 0 to 24 kHz, matches that of the core coder. As a result, the difference signal can be formed in the transform or subband domain instead of the time domain. This reduces the amount of delay and the number of computations.

In the first example the digital audio is represented by 24-bit PCM samples with a 96 kHz period. The digital audio is first low-pass filtered 202 to reduce its bandwidth to below 24 kHz, and then decimated 204 by a factor of two, resulting in an effective 48 kHz sampled signal. The down sampled signal is then fed to the core encoder 206. The N-band filter bank 208 in the core encoder decomposes the down-sampled signal into N subbands. Each subband may be encoded using a multitude of adaptive prediction, scalar and/or vector quantization, and entropy coding techniques 210. In an optimum configuration, the subband coding techniques will math those used in the core encoders. The resulting bit stream is then placed in the packer. This bit stream is also fed to a core subband decoder 212 to reconstruct subband samples for later use by the extension encoder to generate subband difference signals.

The 96 kHz sampled input PCM signal is delayed 214 and then fed to a two-band filter bank 216 to generate two 48 kHz sampled subband signals. The lower band signal is decomposed by the same N-band filter bank 218 as the one used by the core encoder into N subband signals. Each of them is subtracted 220 by its respective subband signals reconstructed from the core encoder to generate the subband difference signal. The difference subband signal is encoded by a subband coder 222 and then placed in the packer 224. The upper band signal from the two-band filter bank is fed to a M-band filter bank 226 to generate M subband signals. They are then encoded by a subband coder 228 and placed in the packer. This subband coder may include a multitude of adaptive prediction, scalar and vector quantization, and/or entropy coding. The delay before the extension encoder is given by:

$$\text{Delay} + \text{Delay}_{\text{2-band filter}} = \text{Delay}_{\text{Decimation LPF}}$$

so that the reconstructed core subband signal and the audio subband signal are exactly time-aligned at summing junction 220 (see FIG. 21($a$)). In the decoder (FIG. 21($b$)), the signals are automatically aligned at the summing junctions. The M-band filter bank must be designed such that its delay matches that of the N-band filter bank. Otherwise, an extra delay must be introduced so that the subband signals in the upper band are delayed as the same as the subband signals in the lower band.

The decoding process is shown in FIG. 21($b$). The core bit stream is unpacked 230 and decoded 232 to generate N core subband signals. If the extension decoder is absent on the player, these core subband signals are fed to the N-band synthesis filter bank 234 to produce core audio. Otherwise, this step is skipped and the core subband signals are fed to the extension decoder 236 and summed 238 with the difference subband signals decoded 240 from the extension bit stream. These summed subband signals are then sent to the N-band synthesis filter bank 242 to produce the lower band signal. The upper band signal is formed by decoding 244 the extension bit stream and feeding the decoded M subband signals to the M-band synthesis filter bank 246. Finally, the upper and lower band signals are sent to the two-bank synthesis filter bank 248 to produce 96 kHz sampled audio output.

The advantages of this open-box approach include reduced coding delays:

$$\text{Encoding Delay} = \text{Delay}_{\text{Decimation LPF}} + \text{Delay}_{\text{Core Encoder}}$$

$$\text{Decoding Delay} = \text{Delay}_{\text{Core Decoder}} + \text{Delay}_{\text{2-band filter}}$$

and decoding complexity:

$$\text{Decoding MIPS} = \text{MIPS}_{\text{Core Decoder}} + \text{MIPS}_{\text{M-band filter}} + \text{MIPS}_{\text{2-band filter}}$$

If the number of FIR filter taps for the M-band and 2-band filter banks are chosen to be small enough, the MIPS necessary for the M-band and two-band synthesis filter banks could be made smaller than that of a N-band synthesis filter bank operating at 48 kHz. Consequently, the total MIPS to decode 96 kHz audio could be smaller than twice of that required by the core decoder handling 48 kHz sampled audio.

Open-Box Codec II

If the M-band filter bank is replaced by a N-band one in Preferred Implementation II, the three filter banks in the extension codec can be combined to form a L-band filter bank where L=M+N (FIGS. 22($a$) and 22($b$)). The combined L-band filter bank may offer less computational load if cosine modulation is implemented using fast algorithms.

FIG. 22($a$) is basically the same as that in Open-Box Implementation II except that the three analysis filter banks in the extension encoder are replaced by a single L-band analysis filter bank 250 and that the reconstructed subband signals from the core encoder are subtracted from the lower N subband signals of the L-band filter bank to produce the difference subband signals. This is possible because each of the lower N subbands of the L-band filter bank of the extension encoder working at 96 kHz sampling rate covers the same audio spectrum as that of the N-band filter bank of the core encoder working at 48 kHz sampling rate. In order for this scheme to succeed, it is imperative, of course, that the filter characteristics of the L- and N-band filter banks match each other even though they work at different sampling frequencies.

The decoding procedure shown in FIG. 22($b$) is almost the same as that in FIG. 21($b$) except that the three synthesis filter banks are replaced with one L-band synthesis filter bank 252 and that the reconstructed subbands of the core decoder are added to the corresponding lower N subbands coming out of the L-band filter bank.

While several illustrative embodiments of the invention have been shown and described, numerous variations and alternate embodiments will occur to those skilled in the art. For example, the sampling rates discussed herein correspond to current standards. As time passes these sampling rates may change. Such variations and alternate embodiments are contemplated, and can be made without departing from the spirit and scope of the invention as defined in the appended claims.

We claim:

1. A multi-channel audio encoder for coding a digital audio signal sampled at a known sampling rate and having an audio bandwidth, comprising:

a core encoder having a sampling rate and audio bandwidth less than that of said digital audio signal;

an extension encoder having a sampling rate and audio bandwidth equal to that of said digital audio signal;

a decimation low pass filter (LPF) that filters the digital audio signal to remove signal components above the audio bandwidth of the core encoder;

a decimator that down samples the filtered signal to extract a core signal whose sampling rate matches the core encoder, wherein said core encoder codes the core signal into core bits;

a core decoder that decodes the core bits to form a reconstructed core signal;

an interpolator that upsamples the reconstructed core signal to the extension encoder sampling rate;

an interpolation LPF that filters the upsampled reconstructed core signal to remove interpolation aliasing; and a summing node that subtracts the filtered signal from the digital audio signal to form a difference signal, wherein said extension encoder encodes the difference signal into extension bits.

2. The multi-channel audio encoder of claim 1, wherein said core bits define a noise floor for the reconstructed core signal across its audio bandwidth, said extension bits further refining the noise floor across the core encoder's audio bandwidth and defining a noise floor for the remainder of the extension encoder's audio bandwidth.

3. The multi-channel audio encoder of claim 1, wherein said core bits define a noise floor for the reconstructed core signal across its audio bandwidth, said extension bits being allocated at frequencies near a transition bandwidth of said decimation LPF and above to define a noise floor for the remainder of the extension encoder's audio bandwidth.

4. The multi-channel audio encoder of claim 1, in which the encoder maintains compatibility with an existing base of first generation audio decoders while providing higher quality sound reproduction with second generation audio decoders, said core decoder comprising one of said first generation audio decoders and said core encoder being compatible with said first generation decoders.

5. The multi-channel audio encoder of claim 4, further comprising a packer that packs the core bits and the extension bits into a bit stream in a core plus extension format in which the first generation audio decoders can extract and decode the core bits to reproduce an audio signal and the second generation audio decoders can extract the core bits plus the extension bits to reproduce a higher quality audio signal.

6. A multi-channel audio encoder for coding a digital audio signal sampled at a known sampling rate and having an audio bandwidth, comprising:

a core encoder having a sampling rate and audio bandwidth less than that of said digital audio signal;

an extension encoder having a sampling rate and audio bandwidth equal to that of said digital audio signal;

a decimation low pass filter (LPF) that filters the digital audio signal to remove signal components above the audio bandwidth of the core encoder, said decimation LPF having a transition bandwidth around the audio bandwidth of the core encoder;

a decimator that down samples the filtered signal to extract a core signal whose sampling rate matches the core encoder, wherein said core encoder codes the core signal into core bits;

an interpolator that upsamples the core signal to the extension encoder sampling rate to form a reconstructed core signal;

an interpolation LPF that filters the reconstructed core signal to remove interpolation aliasing; and a summing node that subtracts said filtered signal from the digital audio signal to form a difference signal, wherein said extension encoder encodes the difference signal into extension bits and allocates bits in said transition bandwidth and above to extend the frequency range of the encoded signal.

7. The multi-channel audio encoder of claim 6, in which the encoder maintains compatibility with an existing base of first generation audio decoders while providing higher quality sound reproduction with second generation audio decoders, said core decoder comprising one of said first generation audio decoders and said core encoder being compatible with said first generation decoders.

8. The multi-channel audio encoder of claim 7, further comprising a packer that packs the core bits and the extension bits into a bit stream in a core plus extension format in which the first generation audio decoders can extract and decode the core bits to reproduce an audio signal and the second generation audio decoders can extract the core bits plus the extension bits to reproduce a higher quality audio signal.

9. A multi-channel audio encoder for coding a digital audio signal sampled at a known sampling rate and having an audio bandwidth, comprising:

a core encoder that extracts and codes a core signal from the digital audio signal over an audio bandwidth into core bits, said core encoder including an N-band filter bank that decomposes the core signal into N subbands and N subband coders that generate the core bits, N subband decoders that reconstruct the N subband samples to form a reconstructed core signal, a summing node that forms a difference signal from the reconstructed core signal and the digital audio signal in a transform or subband domain; and an extension encoder that encodes the difference signal into extension bits, said extension encoder matching the core encoder over its audio bandwidth and comprising, a two band filter bank that splits the digital audio signal into lower and upper bands;

a N-band filter bank equivalent to the core encoder's that decomposes the digital audio signal in the lower band into N subbands, said summing node existing inside said extension encoder and comprising N subband nodes that subtract the reconstructed N subband samples from the digital audio signal's N subbands, respectively to form N difference subbands;

N subband coders that code the N difference subbands to form the lower band extension bits;

a M-band filter bank that decomposes the digital audio signal in the upper band into M subbands; and M subband coders that code the M subbands to form the upper band extension bits.

10. A multi-channel audio encoder for coding a digital audio signal sampled at a known sampling rate and having an audio bandwidth, comprising:

a core encoder that extracts and codes a core signal from the digital audio signal over an audio bandwidth into core bits, said core encoder including an N-band filter bank that decomposes the core signal into N subbands and N subband coders that generate the core bits, N subband decoders that reconstruct the N subband samples to form a reconstructed core signal, a summing node that forms a difference signal from the reconstructed core signal and the digital audio signal in a transform or subband domain; and an extension encoder that encodes the difference signal into extension bits, said extension encoder matching the core encoder over its audio bandwidth and comprising, an L-band filter bank that decomposes the digital audio signal into N lower subbands and M upper subbands, the filter characteristics of said L-band filter bank matching those of said N-band filter bank over its N lower subbands, said summing node existing inside said extension coder and comprising N subband nodes that subtract the reconstructed N subband samples from the digital audio signal's N subbands, respectively to form N difference subbands;

N subband coders that code the N difference subbands to form the lower band extension bits; and M subband coders that code the M subbands to form the upper band extension bits.

11. A multi-channel black-box audio decoder for reconstructing multiple audio channels from a bit stream, in which each audio channel was sampled at a known sampling rate and has an audio bandwidth, comprising:

an unpacker for reading in and storing the bit stream a frame at a time, each of said frames including a core field having core bits and an extension field having a sync word and extension bits, said unpacker extracting said core bits and detecting said sync word to extract and separate the extension bits;

a core decoder decodes the core bits to form a reconstructed core signal;

an extension decoder that decodes the extension bits to form a reconstructed difference signal, said extension decoder having a sampling rate and an audio bandwidth greater than said core decoder;

an interpolator that upsamples the reconstructed core signal to the sampling rate of the extension encoder;

a low pass filter that filters the upsampled reconstructed core signal to attenuate interpolation aliasing, and a summation node that adds the reconstructed difference audio signal to the reconstructed core audio signal to improve the fidelity of the reconstructed core audio signal and extend its audio bandwidth.

12. A multi-channel open-box audio decoder for reconstructing multiple audio channels from a bit stream, in which each audio channel was sampled at a known sampling rate and has an audio bandwidth, comprising:

an unpacker for reading in and storing the bit stream a frame at a time, each of said frames including a core field having core bits and an extension fields having a sync word and extension bits, said unpacker extracting said core bits and detecting said sync word to extract and separate the extension bits;

N core subband decoders that decode the core bits into N core subband signals

N extension subband decoders that decode the extension bits into a lower N extension subband signals;

M extension subband decoders that decode the extension bits into an upper M extension subband signals;

N summation nodes that sum the N core subband signals to the respective N extension subband signals to form N composite subband signals; and a filter that synthesizes the N composite subband signals and the M extension subband signals to reproduce a multi-channel audio signal.

13. The multi-channel audio decoder of claim 12, where the filter is a single M+N band filterbank in which the lower N bands are compatible with the N core subband decoders.

14. The multi-channel audio decoder of claim 12, where the filter comprises:

an N-band filter bank, which is compatible with the N core subband decoders, that synthesizes the N composite subband signals;

an M-band filter bank that synthesizes the M extension subband signals; and a 2-band filter bank that combines the outputs of the N and M band filter banks to reconstruct the multi-channel audio signal.

15. An article of manufacture for use with an existing base of first generation audio decoders that are capable of reconstructing a core signal up to an audio bandwidth and sample resolution and a developing base of second generation audio decoders having a larger audio bandwidth, comprising:

a portable machine readable storage medium for use with said first and second generation audio decoders; and a single digital bit stream representing a multi-channel audio signal written onto said storage medium in a core plus extension format, said bit stream comprising a sequence of synchronized frames, each of said frames including a core field having a core sync word immediately proceeding core bits and an extension fields having an extension sync word immediately proceeding extension bits, said sequence of core bits defining a noise floor for the reconstructed core signal across the audio bandwidth of said first generation audio decoders, and said sequence of extension bits further refining the noise floor across the core encoder's audio bandwidth and defining a noise floor for the remainder of the audio bandwidth of the second generation audio decoders.

16. A digital audio signal embodied in a carrier wave comprising a sequence of synchronized frames, each of said frames comprising a core field having core bits that represent a core signal up to an audio bandwith and sample resolution and an extension field having an extension sync word and extension bits that represent an extension audio signal that extends the audio bandwith and/or increases the sample resolution of the core signal.

17. The digital audio signal of claim 16, wherein said digital audio signal comprises one and only one said sequence of synchronized frames.

18. The digital audio signal of claim 16, wherein each said core field includes a core sync word.

19. A method of encoding a multi-channel digital audio signal sampled at a known sampling rate and having an audio bandwidth that maintains compatibility with an existing base of first generation audio decoders while providing higher quality sound reproduction with second generation audio decoders, comprising:

low pass filtering the digital audio signal to remove signal components above a core audio bandwidth;

down sampling the filtered signal to extract a core signal whose sampling rate matches a core sampling rate;

in a manner compatible with said first generation audio decoders, encoding the core signal at the core sampling rate and the core audio bandwidth less than that of said digital audio signal into core bits without aliasing fold-back;

using a first generation audio decoder to decode the core bits to form a reconstructed core signal;

upsampling the reconstructed core signal to an extension sampling rate;

low pass filtering the upsampled reconstructed core signal to remove interpolation aliasing;

subtracting said filtered reconstructed core signal from the digital audio signal to form a difference signal;

encoding the difference signal at the extension sampling rate and an extension audio bandwidth equal to that of said digital audio signal; and packing the core bits and the extension bits into a bit stream in a core plus extension format in which the first generation audio decoders can extract and decode the core bits to reproduce an audio signal and the second generation audio decoders can extract the core bits plus the extension bits to reproduce a higher quality audio signal.

20. A method of encoding a multi-channel digital audio signal sampled at a known sampling rate and having an audio bandwidth that maintains compatibility with an existing base of first generation audio decoders while providing higher quality sound reproduction with second generation audio decoders, comprising:

low pass filtering the digital audio signal to remove signal components above a core audio bandwidth, said filtering exhibiting a transition bandwidth around the core audio bandwidth;

down sampling the filtered signal to extract a core signal whose sampling rate matches a core sampling rate;

in a manner compatible with said first generation audio decoders, encoding the core signal at the core sampling rate and a core audio bandwidth less than that of said digital audio signal into core bits without aliasing fold-back;

upsampling the core signal to an extension sampling rate to form a reconstructed core signal;

filtering the reconstructed core signal to remove interpolation aliasing;

subtracting said filtered reconstructed core signal from the digital audio signal to form a difference signal;

encoding the difference signal at the extension sampling rate and an extension audio bandwidth equal to that of said digital audio signal into extension bits, said extension bits being allocated in said transition bandwidth and above to extend the frequency range of the encoded audio signal; and packing the core bits and the extension bits into a bit stream in a core plus extension format in which the first generation audio decoders can extract and decode the core bits to reproduce an audio signal and the second generation audio decoders can extract the core bits plus the extension bits to reproduce a higher quality audio signal.

21. A method of reconstructing a multi-channel audio signal comprising:

receiving a sequence of encoded frames, each of said frames including a core field having a core sync word immediately proceeding core bits and an extension fields having an extension sync word immediately proceeding extension bits;

detecting the core sync word to extract and then decode the core bits into a reconstructed core signal;

detecting the extension sync word to extract and then decode the extension bits into a reconstructed difference signal at a sampling rate and with an audio bandwidth greater than said core bits;

upsampling the reconstructed core signal to the sampling rate of the reconstructed difference signal; and low pass filtering the upsampled reconstructed core signal to attenuate interpolation aliasing; and summing the filtered and upsampled reconstructed core signal and the reconstructed difference signal to reconstruct the multi-channel audio signal.

* * * * *